US011990992B2

United States Patent
Trundle et al.

(10) Patent No.: US 11,990,992 B2
(45) Date of Patent: May 21, 2024

(54) SYSTEM AND METHOD FOR TRIGGERING AN ALARM DURING A SENSOR JAMMING ATTACK

(71) Applicant: Alarm.com Incorporated, Tysons, VA (US)

(72) Inventors: Stephen Scott Trundle, Falls Church, VA (US); Alexander Lawrence Reeder, Arlington, VA (US); Charles Richard Alpert, Snoqualmie, WA (US); Noah Robert Weingart, Arlington, VA (US)

(73) Assignee: Alarm.com Incorporated, Tysons, VA (US)

(*) Notice: Subject to any disclaimer, the term of this patent is extended or adjusted under 35 U.S.C. 154(b) by 0 days.

(21) Appl. No.: 17/983,492

(22) Filed: Nov. 9, 2022

(65) Prior Publication Data

US 2023/0075485 A1 Mar. 9, 2023

Related U.S. Application Data

(63) Continuation of application No. 17/037,944, filed on Sep. 30, 2020, now Pat. No. 11,502,773, which is a (Continued)

(51) Int. Cl.

*H04K 3/00* (2006.01)
*G08B 25/10* (2006.01)

(Continued)

(52) U.S. Cl.

CPC ............... *H04K 3/94* (2013.01); *G08B 25/10* (2013.01); *H04K 3/224* (2013.01); *H04K 3/226* (2013.01); *H04K 3/45* (2013.01); *G08B 13/00* (2013.01)

(58) Field of Classification Search

CPC . H04B 1/04; H04B 1/06; H04B 11/00; H04B 1/10; H04W 84/88; H04K 3/00;

(Continued)

(56) References Cited

U.S. PATENT DOCUMENTS 5,950,110 A 9/1999 Hendrickson
7,202,784 B1 4/2007 Herwig (Continued)

FOREIGN PATENT DOCUMENTS

GB 2313980 12/1997
GB 2457102 8/2009

OTHER PUBLICATIONS

PCT International Search Report and Written Opinion in International Application No. PCT/US2018/045270, dated Sep. 24, 2018, 15 pages.

(Continued)

*Primary Examiner* — Blane J Jackson
(74) *Attorney, Agent, or Firm* — Fish & Richardson P.C.

(57) ABSTRACT

Methods, systems, and apparatus, including computer programs encoded on a storage device, for triggering an alarm during a sensor jamming attack. In one aspect, a monitoring system sensor unit is disclosed that includes a sensor, a communication unit configured to communicate with a monitoring system using a range of frequencies, and a jamming detection unit. The jamming detection unit may include a processor and a computer storage media storing instructions that, when executed by the processor, cause the processor to perform operations. The operations include detecting a sensor jamming event, selecting a different form of communication other than the range of radio frequencies for the communication unit to communicate with the monitoring system, and providing, to the communication unit, an instruction to communicate with the monitoring system (Continued)

using the form of communication, wherein the communication unit may communicate, to the monitoring system using the form of communication, the sensor data.

20 Claims, 5 Drawing Sheets

Related U.S. Application Data continuation of application No. 16/716,305, filed on Dec. 16, 2019, now Pat. No. 10,826,646, which is a continuation of application No. 16/054,782, filed on Aug. 3, 2018, now Pat. No. 10,511,404.

(60) Provisional application No. 62/540,760, filed on Aug. 3, 2017.

(51) Int. Cl.
*H04B 11/00* (2006.01)
*G08B 13/00* (2006.01)

(58) Field of Classification Search
CPC ............ H04K 3/45; H04K 3/94; H04K 3/224; H04K 3/40; H04K 3/80
See application file for complete search history.

(56) References Cited

U.S. PATENT DOCUMENTS

| | | | | |
|---|---|---|---|---|
| 9,633,547 | B2 * | 4/2017 | Farrand | G08B 25/001 |
| 9,778,491 | B2 * | 10/2017 | Rinella | G02C 7/12 |
| 9,787,424 | B2 | 10/2017 | Filson et al. | |
| 9,905,120 | B1 * | 2/2018 | Vanchev | G08B 29/18 |
| 10,255,792 | B2 * | 4/2019 | Farrand | G08B 25/001 |
| 10,511,404 | B2 | 12/2019 | Trundle et al. | |
| 10,769,931 | B2 * | 9/2020 | Krein | G08B 25/001 |
| 10,818,158 | B2 * | 10/2020 | Farrand | G08B 25/08 |
| 10,826,646 | B2 | 11/2020 | Trundle et al. | |
| 11,502,773 | B2 | 11/2022 | Trundle et al. | |
| 2013/0336130 | A1 | 12/2013 | Kore et al. | |
| 2018/0365969 | A1 * | 12/2018 | Krein | G08B 25/00 |

OTHER PUBLICATIONS

PCT International Preliminary Report on Patentability in International Application No. PCT/US2018/045270, dated Feb. 13, 2020, 10 pages.

Extended European Search Report in European Appln. No. 22199533.5, dated Apr. 17, 2023, 9 pages.

* cited by examiner

SYSTEM AND METHOD FOR TRIGGERING AN ALARM DURING A SENSOR JAMMING ATTACK

CROSS-REFERENCE TO RELATED APPLICATIONS

This application is a continuation of U.S. application Ser. No. 17/037,944, filed Sep. 30, 2020, which is a continuation of U.S. application Ser. No. 16/716,305, filed Dec. 16, 2019, now U.S. Pat. No. 10,826,646, issued Nov. 3, 2020, which is a continuation of U.S. application Ser. No. 16/054,782, filed Aug. 3, 2018, now U.S. Pat. No. 10,511,404, issued Dec. 17, 2019, which claims the benefit of U.S. Provisional Patent Application No. 62/540,760 filed Aug. 3, 2017 and entitled "System and Method for Triggering an Alarm During a Sensor Jamming Attack." All of these prior applications are incorporated by reference in their entirety.

BACKGROUND

Connected-home monitoring system sensors can include wired sensors or wireless sensors. Wired sensors can be disabled by, for example, a trespasser by cutting one or more physical communication lines connecting the sensor to a security panel, communication unit, or both. Wireless monitoring system sensors provide a variety of advantages over wired sensors including, for example, easier installation since wires do not need to be run. Moreover, wireless sensors cannot be disabled by a trespasser cutting a physical communication line.

SUMMARY

A trespasser possessing sufficient knowledge of the sensor (e.g., the sensor's RF communication frequency) and necessary equipment (e.g., device to output excess amounts of RF waves of the same, or multiple different, frequencies) can attempt to jam wireless sensors by creating a sufficient amount of noise so that sensor data generated by the wireless sensors cannot be sufficiently communicated by the sensor, detected by a monitoring system control unit (or other monitoring system device), or a combination thereof. Therefore, a need exists for a monitoring system sensor unit that can reliably communicate with a monitoring system during a sensor jamming attack. Such a monitoring system sensor unit can enable triggering of an alarm during a sensor jamming attack.

According to one innovative aspect of the present disclosure, a apparatus, system, method, and computer program for triggering an alarm during a sensor jamming event is disclosed. In one aspect, a monitoring system sensor unit may include a sensor that is configured to generate sensor data, a communication unit that is configured to communicate, using a range of radio frequencies, with a monitoring system that is configured to monitor a property, and a jamming detection unit, wherein the jamming detection unit comprises: one or more processors and one or more computer storage media storing instructions that are operable, when executed by the one or more processors, to cause the one or more processors to perform operations comprising: detecting a sensor jamming event, based on detecting the sensor jamming event, selecting a form of communication other than the range of radio frequencies for the communication unit to communicate with the monitoring system, and providing, to the communication unit, an instruction to communicate with the monitoring system using the form of communication, wherein the communication unit is further configured to communicate, to the monitoring system and using the form of communication, the sensor data.

Other aspects include corresponding systems, methods, apparatus, and computer programs to perform actions of methods defined by instructions encoded on one or more computer storage devices.

These and other versions may optionally include one or more of the following features. For example, in some implementations, the sensor data may include data that identifies the monitoring system sensor unit.

In some implementations, the sensor data may include data indicating that the monitoring system sensor unit has detected the occurrence of a sensor jamming event.

In some implementations, the sensor data may describe an attribute of the property that was sensed by the monitoring system sensor unit.

In some implementations, the attribute of the property that was sensed by the monitoring system sensor unit may include at least one of (i) an indication that a door was opened, (ii) an indication that a window was opened, (iii) an indication that motion was detected, (iv) an indication that glass was broken, (v) an indication that smoke was detected, (vi) an indication that carbon monoxide was detected, or (vii) an indication that moisture was detected.

In some implementations, detecting a sensor jamming event may include determining that an amount of radio frequency waves detected by the jamming detection unit satisfies a predetermined threshold.

In some implementations, determining that an amount of radio frequency waves detected by the jamming detection unit satisfies a predetermined threshold may include determining, by the jamming detection unit, that a power level of the detected radio frequency waves exceeds a predetermined threshold.

In some implementations, detecting a sensor jamming event may include determining that the communication unit is not able to communicate, to the monitoring system and using the range of radio frequencies, the sensor data.

In some implementations, selecting the form of communication for the communication unit to communicate with the monitoring system may include selecting a different range of radio frequencies for the communication unit to communicate with the monitoring system. In such implementations, providing, to the communication unit, an instruction to communicate with the monitoring system using the form of communication may include providing, to the communication unit, an instruction to communicate with the monitoring system using the different range of radio frequencies, and the communication unit is further configured to communicate, to the monitoring system and using the different range of radio frequencies, the sensor data.

In some implementations, the communication unit may include a first radio frequency communication unit that is configured to communicate, using the first range of radio frequencies, with the monitoring system, and a second radio frequency communication unit that is configured to communicate, using a second, different range of radio frequencies, with the monitoring system. In such implementations, selecting the form of communication for the communication unit to communicate with the monitoring system may include selecting the second, different range of radio frequencies for the communication unit to communicate with the monitoring system. In such implementations providing, to the communication unit, an instruction to communicate with the monitoring system using the form of communication may include providing, to the communication unit, an instruction to communicate with the monitoring system using the second, different range of radio frequencies, and the communication unit is further configured to communicate, to the monitoring system and using the form of communication, the sensor data by communicating, to the monitoring system and using the second radio frequency communication unit that is configured to communicate, using the second, different range of radio frequencies, the sensor data.

In some implementations, the communication unit may include a speaker that is configured to communicate with the monitoring system using audio. In such implementations, selecting the form of communication for the communication unit to communicate with the monitoring system may include determining that the communication unit communicate with the monitoring system using audio. In such implementations providing, to the communication unit, an instruction to communicate with the monitoring system using the form of communication may include providing, to the communication unit, an instruction to communicate with the monitoring system using audio, and the communication unit is further configured to communicate, to the monitoring system and using the form of communication, the sensor data by communicating, to the monitoring system, the sensor data using audio.

In some implementations, communicating, to the monitoring system, the sensor data using audio may include encoding, by the communication unit, the sensor data into one or more audio tones representing the sensor data.

In some implementations, the jamming detection unit comprises a radio frequency receiver.

DETAILED DESCRIPTION

The subject matter of the present disclosure is directed towards a connected-home monitoring system that includes one or more "wireless sensing units" that are configured to trigger an alarm during an RF jamming attack by a jamming device. In response to the detection of an RF jamming attack of a first range of radio frequencies, the wireless sensing units can use a different form of communication that is not being jammed by the RF jamming device to communicate with another component of the connected-home monitoring system. In some implementations, the different form of communication may be a non-RF, non-wired form of communication such as one or more audio tones. Alternatively, or in addition, the different form of communication may include an RF communication using a different range of frequencies than the first range of radio frequencies, the RF waves generated by the jamming device, or both. Alternatively, or in addition, the different form of communication may include a wired form of communication such as an Ethernet cable. The communication transmitted by the wireless sensing units using the different form of communication that is not being jammed by the RF jamming device (e.g., one or more audio tones) may include sensor data that can be detected by another component of the connected-home monitoring system, which can then trigger an alarm based on the sensor data. For purposes of this specification, the phrase "audio tones," "audio sounds," or "audio" refers to a sound that is able to be detected by a microphone. Such "audio tones," "audio sounds," or "audio" may include ultrasonic audio. Such "audio tones," "audio sounds," or just "audio" need not be detectable by a human ear.

The subject matter of the present disclosure describes implementations of a "connected-home monitoring system" that is configured to trigger an alarm during an RF jamming attack. Though the described connected-home monitoring system includes the word "home," and FIG. 1, described in more detail below, depicts a single-family house, the connected-home monitoring systems described by the present disclosure are not limited to a single-family home, single-family house, or other residential property. Instead, the connected-home monitoring systems described by the present disclosure can be used in a variety of different properties including, e.g., row homes, apartment buildings, industrial properties (such as factories), commercial properties (such as office buildings, retail locations, or the like), or the like.

Figure 1:
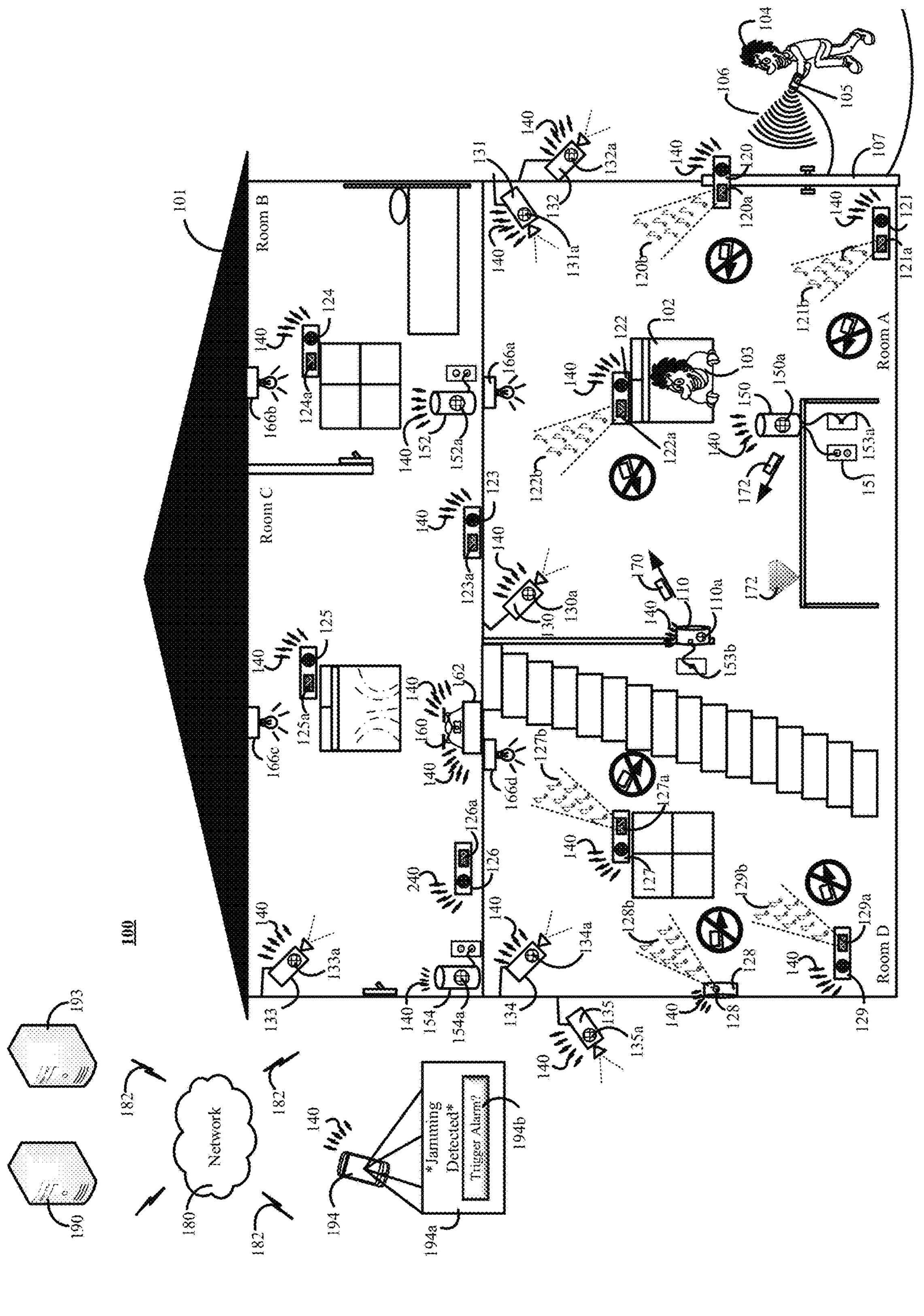
FIG. 1 is a contextual diagram of an example of a connected-home monitoring system for triggering an alarm during a sensor jamming attack.

FIG. 1 is a contextual diagram of an example of a connected-home monitoring system 100 for triggering an alarm during a sensor jamming attack.

The connected-home monitoring system 100 includes a monitoring system control unit 110, at least one sensing unit 120, and at least one listening device. In some implementations, a listening device may be the monitoring system control unit 110 that includes a microphone 110*a* that is coupled to (or otherwise integrated with) the monitoring system control unit 110. Alternatively, or in addition, the listening device may include one or devices that are different than the monitoring system control unit 110 such as listening devices 150, 152, 154 that each include a respective microphone 150*a*, 152*a*, 154*a*. Alternatively, or in addition, the listening device may also include one or more cameras 130, 131, 132, 133, 134, 135 that each include a respective microphone 130*a*, 131*a*, 132*a*, 133*a*, 134*a*, 135*a*. Alternatively, or in addition, the listening device may include any other device that includes a microphone and (i) is installed at the property 101, and (ii) is integrated with the connected-home monitoring system 100. Such other devices may include, for example, a smoke detector, a connected light bulb 166*a*, 166*b*, 166*c*, 166*d*, a connected light bulb adapter, or any other device that includes a microphone, communication module, and (i) is installed at the property 101, and (ii) integrated within the connected-home monitoring system 100 (e.g., able to communicate with other components of the monitoring system 100).

Generally, the connected-home monitoring system 100 may trigger an alarm if, for example, the monitoring system control unit 110 detects sensor data generated and transmitted by the at least one sensing unit 120 that is indicative of a potential alarm event (e.g., contact sensor indicating a door or window has opened, a glass break sensor indicating that a window was broken, motion sensor detecting motion inside the property 101, or the like) without a security code being entered into the monitoring system control unit 110 within a predetermined amount of time of the potential event. In some implementations, the monitoring system control unit 110 can also be configured to trigger an alarm as soon sensor data is generated and transmitted that is indicative of a potential event (e.g., contact sensor indicating a door or window has opened, a glass break sensor indicating that a window was broken, motion sensor detecting motion inside the property 101, or the like) immediately—e.g., without waiting for a security code to be entered into a the monitoring system control unit 110 within a predetermined period of time of transmission of the generated sensor data.

In some implementations, the connected-home monitoring system 100 can also include a plurality of sensing units 120, 121, 122, 123, 124, 125, 126, 127, 128, 129, a plurality of cameras 130, 131, 132, 133, 134, 135, a wireless network 140, a plurality of listening devices 110*a*, 150, 152, 154, a drone 160, a drone charging station 162, a network 180, one or more communication links 182, a monitoring application server 190, a central alarm station server 193, a user device 194, or a combination thereof.

With reference to the example of FIG. 1, multiple trespassers 103, 104 are attempting to break into the property 101 in order to steal the diamond 172. Recognizing that the property 101 has a connected-home monitoring system 100 installed, the trespasser 104 may use a jamming device 105 to initiate a jamming attack on one or more sensing units 120, 121, 122, 123, 124, 125, 126, 127, 128, 129 installed at the property 101 as part of the connected-home monitoring system 100. The jamming device 105 may jam one or more of the sensing units 120, 121, 122, 123, 124, 125, 126, 127, 128, 129 by transmitting high volumes of RF waves at the same frequencies, different frequencies, or both, in an effort to create interference that disrupts the RF communications of one or more sensing units 120, 121, 122, 123, 124, 125, 126, 127, 128, 129. Under such circumstance, conventional sensing units may be prohibited from generating, transmitting, or both, data that is indicative of a potential alarm event because the interference created by the jamming device 105 prohibits accurate communication of sensor data to the monitoring system control unit 110 via a network 140 using the jammed RF communication frequencies. The network 140 may include one or more of a LAN, a WAN, a cellular network, a Z-wave network, a ZigBee network, the Internet, or a combination thereof, that are each respectively used for network communication by one or more components of the controlled-home monitoring system 100. The network 140 may include one or more wired networks (e.g., Ethernet), wireless networks (e.g., Wi-Fi), or a combination thereof.

One or more sensing units of the plurality of sensing units 120, 121, 122, 123, 124, 125, 126, 127, 128, 129 installed at the property 101 are configured to detect whether or not a potential jamming event (e.g., a jamming attack by an intruder 104) is occurring. In some implementations, one or more of the sensing units 120, 121, 122, 123, 124, 125, 126, 127, 128, 129 can be equipped with an RF receiver that is configured to detect an amount of RF waves being broadcast in the vicinity of the RF receiver. For example, the RF receiver, or other component of the sensing unit, can be configured to determine whether power level of detected radio waves exceeds a predetermined threshold. The power level of the detected radio waves may be determined based on the amplitude of the detected radio waves. Alternatively, or in addition, the power level may be determined in other ways. For example, a power level of detected radio waves may be determined that is based on spectral power density, spectral power, or the like. Other ways of measuring the power level of detected radio waves also fall within the scope of the present disclosure.

If the sensing unit determines that the amount of RF waves detected by the RF receiver does not satisfy a predetermined threshold, then the sensing unit may determine that the sensing unit is not being subjected to a potential jamming event. Alternatively, if the sensing unit determines that the amount of RF waves detected by the RF receiver of the sensing unit does satisfy a predetermined threshold, then the sensing unit may determine that the sensing unit is being subjected to a potential jamming event.

However, the present disclosure should not be limited to detecting a jamming event based a sensing unit detecting an amount of RF waves being broadcast in the vicinity of the RF receiver. Instead, other methods for detecting a jamming event may be utilized. For example, during a jamming event, one or more of the sensing units 120, 121, 122, 123, 124, 125, 126, 127, 128, 129 may be configured to perform an initial attempt to communicate with the monitoring system control unit 110 or monitoring application server 190 using a conventional RF channel using a first range of radio communication frequencies. However, a sensing unit subject to a jamming event may determine that the sensing unit is not able to establish a communication channel to successfully communicate sensor data to the monitoring system using its RF communication unit using an initial range of radio frequencies. Based on the sensing unit's inability to successfully establish a communication channel to successfully communicate with the monitoring system, the sensing unit can determine that jamming event is likely occurring.

By way of example, the controlled-home monitoring system may include a contact sensing unit 120. A contact sensing unit 120 may include at least a contact sensor, an RF receiving unit, and a speaker 120*a*. The contact sensor of the contact sensing unit 120 is configured to generate, when the controlled-home monitoring system 100 is in the "armed" state, sensor data indicative of a potential alarm event when the door 107 is opened. However, the contact sensing unit 120, like other jammed sensing units 121, 122, 123, 127, 128, 129, cannot generate and successfully transmit sensor data using its conventional RF communication channel because of the interference caused by the potential jamming event. The other jammed sensing units 121, 122, 123, 127, 128, 129 may include, for example, motion sensing units 121, 129, glass break sensing units 122, 127, and a temperature sensor 128.

With reference to the example of FIG. 1, the intruder 104 can use the jamming device 105 to generate RF waves 106. The RF waves 106 generated by the jamming device 105 may be received (or detected) by an RF receiver of one or more sensing units such as a contact sensing unit 120. The RF receiver of the contact sensing unit 120 may determine that the amount of received RF waves 106 satisfies a predetermined threshold, and therefore determine that the contact sensing unit 120 is being subjected to a potential jamming event. Such a potential jamming event initiated by a jamming device 105 may jam multiple sensing units of the property 101 within range of the RF waves 106. For example, the jamming attack may jam sensing units 120, 121, 122, 127, 128, 129.

Lack of the respective sensing units 120, 121, 122, 127, 128, 129 to generate and successfully transmit sensor data using conventional RF communication means, while jammed, is depicted in FIG. 1 using respective rectangle message icons and arrow icons that are crossed out within respective circles. Since the primary RF communication means of the respective sensor units are jammed, absent the advantages provided by the present disclosure, the trespassers 104 could enter through the door 107 (and not enter a security code) without a contact sensor on the door 107 triggering an alarm, the trespasser 103 could break the window 102 (and not enter a security code) without a glass-break sensor 122 triggering an alarm, or the like. In such instances the trespassers 103, 104 could enter the property and steal the diamond 172. Yet, even with such a jamming attack, other sensing units may not be jammed by the jamming device 105 because, for example, the sensing units are out of range of the jamming device 105.

Using the techniques of the present disclosure, the contact sensing unit 120 can, in response to detecting the occurrence of a potential jamming event, select and use an alternative form of non jammed communications to notify another component of the monitoring system of the potential jamming event. For example, in response to determining that a potential jamming event is occurring, a sensing unit such as the contact sensing unit 120 can output one or more audio tones 120*b* using a speaker 120*a*. The audio tones 120*b* may be detectable by a human ear. Alternatively, the audio tones 120*b* may be output at a frequency that is not detectable by a human ear. In some implementations, the audio tones 120*b* may include one or more audio tones that are devoid of any kind of information other than audio sound that is made by the tones produced by the speaker 120*a*. Alternatively, for example, the sensing unit 120 may encode information into a series of audio tones using varying pitches, varying durations, separated by varying amounts of time, or a combination thereof. In some implementations, an encoding scheme such as Morse code could be used to encode information into the audio tones. Using such encoding techniques, the sensing unit 120 can encode data into the audio tones 120*b* indicating (i) that the door has been opened, (ii) a sensor identifier, a (iii) a combination thereof, or the like. The audio tones 120*b* can be detected by one or more listening devices such as a microphone 110*a* that have been coupled to the monitoring system control unit 110.

By way of example, the monitoring system control unit 110 can detect the audio tones 120*b* using the microphone 110*a*. The monitoring system control unit 110 is configured to determine, based on the one or more detected audio tones 120*b*, that a potential jamming event is occurring. For example, in one implementation, the monitoring system control unit 110 may determine that a potential jamming event is occurring if any sensing unit of the plurality of sensing units 120, 121, 122, 123, 124, 125, 126, 127, 128, 129 starts generating audio tones such as audio tones 120*b*, 121*b*, 122*b*, 127*b*, 128*b*, 129*b*. Alternatively, in some implementations, the monitoring system control unit 110 may only determine that a potential jamming event is occurring in response to a determination that more than a threshold amount of sensing units are outputting audio tones. Such a restriction (e.g., a threshold amount of sensing units outputting audio tones) on the determination of a potential jamming event may prevent the monitoring system control unit 110 from determining that a potential jamming event is occurring when interference from a household device such as a baby monitor generates enough interference within the vicinity of a sensing unit to effectively "jam" the sensing unit's RF communication means. In such instances, since only one (or a few, but less than a threshold number of) sensing unit(s) has its RF communication means "jammed," the monitoring system control unit 110 may determine that a potential jamming event is not occurring. In some implementations, the threshold number of sensing units that are required to be detected by the monitoring system control unit 110 may be configured by a legal occupant of the property 101.

The monitoring system control unit 110 can perform a number of operations based on the determination that a potential RF jamming event is occurring. For example, the monitoring system control unit 110 can immediately trigger an alarm in response to the determination that a potential RF jamming event is occurring (without first notifying a mobile device of a legitimate occupant of the property 101). Triggering an alarm may include (i) sounding an alarm via speakers installed at the property in an attempt to scare away the trespassers 103, 104, (ii) sending an alert 170 to the monitoring application server 190, (iii) sending an alert 170 to the central alarm station server 193, or a combination thereof. The central alarm station server 193 can dispatch law enforcement agents to the property 101 in an attempt to apprehend the trespassers 103, 104. Each of the aforementioned alerts may be transmitted using network 140, the network 180, one or more communication links 182, or a combination thereof. The network 180 may include one or more of a LAN, a WAN, a cellular network, the Internet, a combination thereof, or the like. Accordingly, the monitoring system control unit 110 can communicate such alerts to remote components using, for example, an internet protocol (IP) or cellular network, that is not being jammed.

In some implementations, the monitoring application server 190 may function as a cloud-based monitoring unit that is remote from the property 101. For example, monitoring application server 190 may receive a notification from the monitoring system control unit 110, evaluate the received notification, and then notify the central alarm station server 193 if the monitoring application server 190 determines that the notification is indicative of a potential jamming event. Evaluating a received notification by the monitoring application server 190 may include analyzing the received notification independent of, or in addition to, other data obtained by the monitoring application server 190 from one or more other components of the controlled-home monitoring system 100.

Alternatively, or in addition, the monitoring system control unit 110 (or monitoring application server 190) may perform other operations in response to the determination that a potential jamming event is occurring at the property 101. For example, the monitoring system control unit 110 (or monitoring application server 190) can notify one or more mobile devices such as mobile device 194 of a legitimate occupant of the property. The notification may be transmitted using one or more networks such as network 140, the network 180, one or more communication links 182, or a combination thereof. For example, both networks 180 and 140 may be required if the mobile device 194 is located at or near the property 101. Alternatively, if remote from the property 101, network 180 may be used without network 140 to communicate with the mobile device 194.

The notification to the mobile device 194 may trigger the generation of a graphical user display 194*a* that includes a selectable icon 194*b*. Accordingly, in some implementations, the decision as to whether to trigger the alarm in response to the detection of a potential jamming event may be deferred to a legitimate occupant of the property 101. Alternatively, in other implementations, the monitoring system control unit 110 (or monitoring application server 190) may immediately trigger an alarm in response to the detection of a potential jamming event without first notifying the mobile device 194 of a legitimate occupant of the property and receiving a response from the mobile device 194. The graphical user display 194*a*, in some implementations, may be a pop-up window or alert that does not cover the entire display of the user device 194.

Alternatively, or in addition, the monitoring system control unit 110 (or the monitoring application server 190) may perform other operations such as initiating a loud chime from one or more devices installed at the property 101 to alert those in (or near) the property 101 of the potential jamming event. In some implementation, the loud chime may be accompanied by a notification sent to one or more mobile devices 194 of a legitimate occupant of the property 101 to describe the reason for the chime (e.g., detection of a potential jamming event). Alternatively, or in addition, the monitoring system control unit 110 (or monitoring application server 190) may transmit an instruction to turn on surveillance devices such as cameras installed at the property 101 that may otherwise only be triggered to record video in response to sensor activity such as the detection of motion. However, sensors associated with the surveillance devices such as cameras may be similarly jammed in response to a potential jamming event. Accordingly, the monitoring system control unit 110 (or monitoring application server 190) can use an alternative form of communication to communicate with the surveillance device to trigger video recording during the jamming attack by using a different RF frequency that is used for the jamming attack. For example, in some implementations, a trespasser 104 may jam a ZigBee network but the monitoring system control unit 110 (or monitoring application server 190) may still communicate with one or more surveillance cameras via a Wi-Fi network.

Alternatively, or in addition, the monitoring system control unit 110 (or monitoring application server 190) may instruct one or more nearby surveillance devices such as one or more cameras associated with one or more nearby properties to turn on and begin recording video in response to the detection of a potential jamming event. Such other nearby surveillance devices may include, for example, a neighbor's video camera, a neighbor's doorbell camera, or the like. The nearby surveillance devices may capture images, video, audio, or a combination thereof, and transmit the images, video, audio, or a combination thereof to the monitoring application server 190. The images, video, audio, or a combination thereof, captured from such nearby surveillance devices could be used as evidence about the vehicles, people (e.g., trespassers 103, 104), and the like that are present in the vicinity of the property 101 during the potential jamming event.

Alternatively, or in addition, the monitoring system control unit 110 (or monitoring application server 190) may communicate with one or more other connected-devices installed at the property 101 in response to a detected jamming event using one or more RF frequencies that are not jammed. For example, the monitoring system control unit 110 (or monitoring application server 190) may communicate using an RF frequency that is not jammed (e.g., a Wi-Fi network) with one or more connected light bulbs to repeatedly turn the light bulbs during a potential jamming event that jams a Z-wave network. In such instances, the monitoring system control unit 110 (or monitoring application server 190) can instruct the one or more connected lightbulbs 166*a*, 166*b*, 166*c*, 166*d* to repeatedly turn on and off in an attempt to scare the trespassers away, draw the attention of neighbors or passers-by, or the like. Alternatively, or in addition, the monitoring system control unit 110 (or monitoring application server 190) may communicate with an irrigation controller installed at the property 101 using, for example, a non-jammed RF frequency, an Ethernet connection, or the like, to turn on an irrigation system to dampen trespassers 103, 104 operating on the outside of the property. This may startle the trespassers 103, 104 and cause them to flee. Alternatively, or in addition, the monitoring system control unit 110 (or monitoring application server 190) can communicate with a drone 160 using a non-jammed RF frequency and instruct the drone to investigate the potential jamming event. Investigating the potential jamming event may include, for example, capturing video, images, audio, or a combination thereof of the vicinity of the potential jamming event. The monitoring system control unit 110 (or monitoring application server 190) may, for example, instruct the drone 160 to follow the trespassers 103, 104 after the trespassers flee in response to an alarm that has been sounded after detection of a potential jamming event. The drone may track the fleeing trespassers, and send the location of the fleeing trespassers to the application server 190, a central alarm station server 193, or a third-party such as a device of a law enforcement agency. One or more law enforcement agents may use the location information identifying the location of the fleeing trespassers that is received from the drone 160 to track, find, and apprehend the fleeing trespassers. The drone may capture biometric data from one or more trespassers such as facial recognition scans, DNA (e.g., getting close enough to contact a trespasser with an extendable arm), hair (e.g., getting close enough to deploy an arm with scissors to clip a portion of a trespasser's hair), or the like.

Alternatively, or in addition, the monitoring system control unit 110 (or monitoring application server 190) may use one or more RF receivers of the monitoring system control unit 110 to obtain and store a detailed record of the interfering RF activity. In some implementations, the obtained detailed record may include the monitoring system control unit 110 (or monitoring application server 190) extracting features of the RF activity related to the RF activities wavelength, frequency, amplitude, or the like. Such a "fingerprint" may be used to identify the particular jamming device that generated the interfering RF activity. The monitoring system control unit 110 may then use the obtained detailed record as a "fingerprint" of the jamming device.

In some implementations, the monitoring system control unit 110 (or monitoring application server 190) may transmit the "fingerprint" of the jamming device to a law enforcement agency so that it can be used for evidentiary purposes. The "fingerprint" of the jamming device may be tagged with data that associates the "fingerprint" with the property 101 and a timestamp of the date, time, or both, when the jamming event occurred. Alternatively, or in addition, this "fingerprint" of the jamming device can be stored in the monitoring system control unit 110, the monitoring application server 190, or both, and be obtained later by one or more law enforcement agents or other persons authorized to access the stored "fingerprint." In the event the trespassers 103, 104 are apprehended, the "fingerprint" of the jamming device can be used to show that the trespassers 103, 104 that were found in possession of a particular jamming device that was used to jam the property's 101 sensors because the "fingerprint" generated by the apprehended jamming device matches the fingerprint generated and stored by the monitoring system control unit 110 (or the monitoring application server 190) during the potential jamming event.

The example described above is an example where the microphone 110*a* that detected the one or more audio tones 120*b* was integrated into the monitoring system control unit 110. However, the present disclosure need not be so limited.

For example, the present disclosure may integrate one or more other listening devices 150, 152, 154 that can be positioned at multiple locations throughout the property 101 and used to detect audio tones 120*b*, 121*b*, 122*b*, 127*b*, 128*b*, 129*b*. Each respective listening device 150, 152, 154 may include a respective microphone 150*a*, 152*a*, 154*a*. Such listening devices may include, a home assistant device such as an Amazon Echo device, a Google Home device, or the like that has been integrated into the controlled-home monitoring system 100. Alternatively, or in addition, other components of the controlled-home monitoring system 100 can also be used as a listening device so long as the components include a microphone and a means to communicate with the monitoring system control unit 110 that is not being jammed. For example, one or more cameras 130, 131, 132, 133, 135 may include, for example, an IP camera 131 that includes a microphone and can communicate via non-jammed RF frequencies such as Wi-Fi though the RF networks used by the sensors such as Z-wave networks may be jammed by the RF waves 106.

In response to detecting audio tones 120*b*, 121*b*, 122*b*, 127*b*, 128*b*, 129*b* indicative of one or more sensors being jammed, the respective listening devices may notify the monitoring system control unit 110 of the detected audio tones. The notification 172 may be sent to the monitoring system control unit 110 (or monitoring application server 190) via one or more wired connections such as a wired Ethernet connection 153*a*, 153*b*. Alternatively, the notification 172 may be transmitted wirelessly to the monitoring system control unit 110 (or monitoring application server 190) using an RF network that is not being jammed such as a Wi-Fi network though the RF networks used by the sensors such as Z-wave networks may be jammed by the RF waves 106.

Each respective listening device may be configured to determine whether the detected audio tones 120*b*, 121*b*, 122*b*, 127*b*, 128*b*, 129*b* are indicative of a potential jamming event. Alternatively, the respective listening devices may be configured to transmit data describing the audio tones that were received, and the monitoring system control unit 110 (or monitoring application server 190) can determine, based on the received information describing the audio tones, whether a potential jamming event is occurring. In some implementations, one or more respective listening devices can transmit a recording of the audio tones to the monitoring system control unit 110 (or monitoring application server 190) that can be analyzed by the monitoring system control unit 110 (or monitoring application server 190) to determine whether a potential jamming event is occurring.

In response to receiving the notification 172, the monitoring system control unit 110 (or monitoring application server 190) can determine, based on the received notification 172 (or other information received from the one or more listening devices) whether a potential jamming event is occurring. In response to determining that a potential jamming event is occurring, the monitoring system control unit 100 (or monitoring application server 190) may perform one or more operations, as described above.

Alternative implementations may be employed using the controlled-home monitoring system 100 to detect a sensor jamming event. In some implementations, for example, it is not necessary for each of a plurality of sensing units such as sensing units 120, 121, 122, 123, 124, 125, 126, 127, 128, 129 to include the capability of determining whether it is being jammed by an RF jamming device. Instead, in such implementations, each of the plurality of sensing units may be configured to periodically broadcast (i) one or more audio tones and (ii) one or more RF data transmissions. The audio tones and RF data transmissions may each include sensor identifying information that is encoded into the audio tones, or RF data transmissions, respectively. The monitoring system control unit 110 may detect the periodic transmissions from each respective sensor and determine whether there is an audio tone and RF data transmission for each respective sensor installed at the property 101. In response to determining that any one particular sensor (or more than a threshold number of sensors) has begun reporting only audio tones, the monitoring system control unit 110 (or monitoring application server 190) may determine that a potential jamming event is occurring. In response to the jamming event, the monitoring system control unit 110 (or monitoring application server 190) may perform one or more of the operations described above to respond to the jamming event.

In some implementations, a jamming event such as jamming attack that results from a trespasser 104 using the jamming device 105 to jam RF data transmissions on one or more frequencies at a property 101 may result in multiple different sensing units 120, 121, 122, 127, 128, 129 being jammed, and then using a respective speakers 120*a*, 121*a*, 122*a*, 127*a*, 128*a*, 129*a* to output audio tones 120*b*, 121*b*, 122*b*, 127*b*, 128*b*, 129*b* at the same time. The monitoring system control unit 110 can interpret the audio tones 120*b*, 121*b*, 122*b*, 127*b*, 128*b*, 129*b* being output by multiple different sensing units 120, 121, 122, 127, 128, 129 in a number of different ways.

For example, in some implementations, the monitoring system control unit 110 may analyze detected audio data for audio tones associated with a specific audio frequency for a minimum duration. For example, the monitoring system control unit 110 may analyze audio data in order to detect an audio signature of a device outputting audio tones having an audio frequency of 32.15 kHz above some volume threshold for a minimum of 5 seconds. The specific frequency and duration for the audio tones may be selected so that the audio tones have an audio signature that is unlikely to be created by any device other than the speakers 120*a*, 121*a*, 122*a*, 127*a*, 128*a*, 129*a* of the sensing units 120, 121, 122, 127, 128, 129 that are designed to signal the detection of an RF jamming event. In such instances, techniques to disambiguate overlapping audio tones is unnecessary, because even if two or more devices detect jamming, they will both transmit the message via the same frequency as a purely binary message (jamming is detected or not detected) and the monitoring system control unit 110 does not need to distinguish between the individual sensing units outputting the audio tones. Therefore, in such implementations, if the monitoring system control unit 110 detects the occurrence of a particular audio signature, then the monitoring system control unit 110 can determine that a potential RF event is taking place.

However, in some implementations, the monitoring system control unit 110 may use a different approach for interpreting the audio tones 120*b*, 121*b*, 122*b*, 127*b*, 128*b*, 129*b* being output by multiple different sensing units 120, 121, 122, 127, 128, 129. For example, the monitoring system control unit 110 may determine a unique identifier of a device outputting audio tones such as audio tones 120*b* that are indicative of a potential RF jamming event. This may allow the monitoring system control unit 110 to identify the approximate direction of the jamming attack.

To facilitate this approach, each respective sensing unit 120, 121, 122, 123, 124, 125, 126, 127, 128, 129 can be configured to include a speaker for outputting audio tones and a microphone for listening for audio tones output by other sensing units. This enables each respective sensing unit to listen for audio tones being output by one or more other components of the monitoring system 100 before beginning to output audio tones indicative of an RF jamming attack. In some implementation, each respective sensing unit 120, 121, 122, 123, 124, 125, 126, 127, 128, 129 is programmed to prevent itself from transmitting data if it detects that there is activity on the transmission frequency such as another sensing unit outputting audio tones indicative of an RF jamming attack. Therefore, only the first sensing unit that is jammed can begin outputting audio tones indicative of a potential jamming attack. Each of the other sensing units would not begin outputting audio tones because their respective microphones would detect the audio tones being output by the first sensing unit.

The monitoring system control unit 110 can then detect the audio signals from the first sensing unit, determine that a potential RF jamming attack is occurring, and then perform one or more operations. This approach provides the advantage of the monitoring system control unit 110 being able to determine the location from where the RF jamming attack is being initiated. For example, the first sensing unit that is outputting the audio tones may encode an identifier of the first sensing unit into the audio tones. The monitoring system control unit 110 can decode the detected audio signals and determine the particular sensing unit that is outputting audio tones indicative of a potential jamming attack. Therefore, the monitoring system control unit 110 can determine that the RF jamming attack was being initiated in the vicinity of the identified sensor that is outputting the audio tones.

In such instances, the monitoring system control unit 110 can perform one or more operations based on the location of the potential jamming attack. For example, the monitoring system control unit 110 can transmit such location information to the central alarm station server 193, activate a camera in the vicinity of the origin of the potential RF jamming attack, deploy a drone 160 to investigate the vicinity of the origin of the potential jamming attack, or the like. In such an implementation, each of the sensing units may be configured to use the same audio frequency to send messages, as only one sensing unit would be outputting audio tones at any particular time in response to a particular RF jamming attack. The other sensing units would not generate audio tones in response to the potential RF jamming attack because the microphones of the other respective sensing units would detect the audio tones of the first sensing unit generated in response to the detection of a potential RF jamming attack and be programmed to not generate audio tones (even if the sensing unit detects a potential jamming attack) because another sensing unit is already using audio tones to report the potential detection of an RF jamming attack.

In some implementations, the monitoring system 100 may take advantage of sensing units that include speakers and microphones in different ways. In this implementations, each sensing unit 120, 121, 122, 123, 124, 125, 126, 127, 128, 129 can be configured so that the respective sensing units work together as part of a mesh network. For example, a first sensing unit of multiple sensing units may detect a potential RF jamming attack and then begin outputting audio tones that are indicative of the detection of a potential jamming attack. Then, a second sensing unit may use its microphone to detect the audio tones output by the first sensing unit, and then begin outputting audio tones indicative of a potential jamming attack based on the microphone of the second sensing unit detecting the audio tones output by the first sensing unit. In this manner, the sensing units 120, 121, 122, 123, 124, 125, 126, 127, 128, 129 can work together as repeaters to communicate the detection of a potential RF jamming attack to a microphone such as a microphone 110*a* of a monitoring system control unit 110 that may be out of range of the first sensing unit that began outputting audio tones in response to the detection of a potential jamming event. The sensing units may continue to detect and repeat the audio tones until a sensing unit that is within audio range of the microphone 110*a* of a monitoring system control unit 110 (or other listening device) detects and repeats the audio tones within range of the microphone 110*a* of the monitoring system control unit 110 (or other listening device).

In other implementations, each respective sensing unit 120, 121, 122, 123, 124, 125, 126, 127, 128, 129 can be configured to output audio tones having unique frequencies. For example, the monitoring system control unit 110 may be configured to recognize multiple RF channels for audio signal output. For example, the system may reserve 100 channels, or more, for audio signal output. Then, each respective sensing unit can be configured to output audio signals, for example, between 32 kHz and 33 kHz at 10 Hz spacing.

In such instances, the monitoring system control unit 110 microphone 110*a* can differentiate between the channels even if each respective sensing unit is transmitting audio tones simultaneously. Such channels may be pre-assigned at the factory, assigned by the monitoring system control unit 110 by way of a "network rediscovery" type event once the devices are installed, or assigned by a certified installer (or other person such as a legitimate occupant of the property 101). In such an implementation, the monitoring system control unit 110 can determine a number of sensing units outputting audio tones in response to the detection of potential RF jamming attack by, for example, determining the number of different channels that are simultaneously being used to output audio tones. The monitoring system control unit 110 can then determine whether the number of sensing units outputting audio tones indicating the detection of a potential RF jamming attack satisfies a predetermined threshold. If the number of sensing units outputting audio tones indicating the detection of a potential RF jamming attack satisfies a predetermined threshold, then the monitoring system control unit 110 may determine that a potential RF jamming event is occurring, and perform one or more operations (described herein) in response to the potential RF jamming event. Alternatively, if the number of sensing units outputting audio tones indicating the detection of a potential RF jamming attack does not satisfy a predetermined threshold, then the monitoring system control unit 110 may determine that a potential RF jamming event is occurring. In such instances, the monitoring system control unit 110 (or monitoring application server 190) may transmit a notification to a user to inspect one or more of the sensing devices for sources of other RF interferences such as a radio, a baby monitor, or the like.

Each of the operations described herein by the monitoring system control unit 110 having a microphone 110*a* with respect to detecting audio tones, decoding audio tones, and identifying the particular one or more sensing units outputting audio signals may also be performed by the other listening device described herein. Alternatively, the respective listening device may detect the audio tones described above, relay data describing the audio tones (e.g., a record, an audio tone signature, or the like) to the monitoring system control unit 110 (or monitoring application server 190) so that the monitoring system control unit 110 (or monitoring application server 190) can perform the operations described above.

Figure 2:
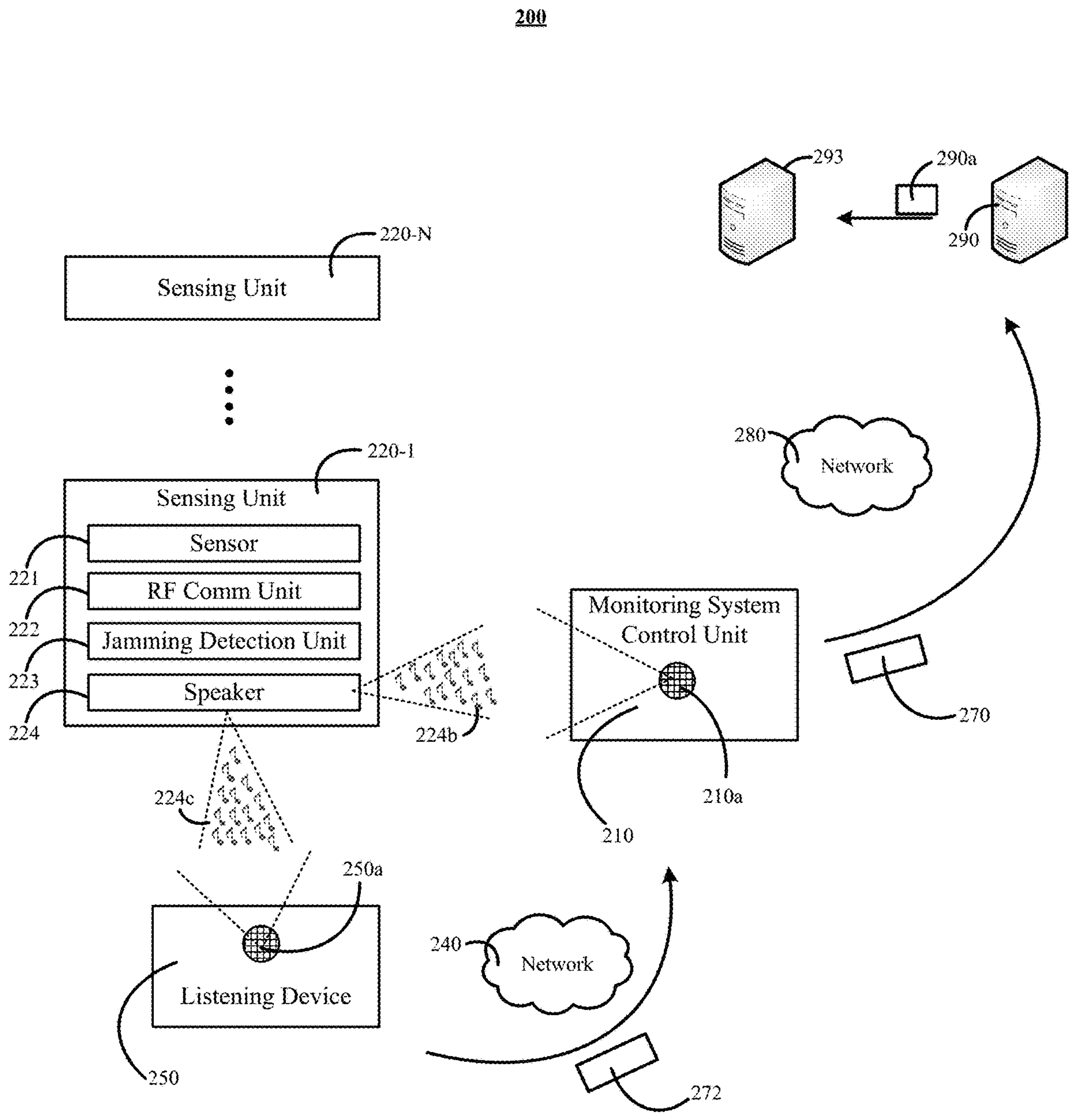
FIG. 2 is a block diagram of an example of a system for triggering an alarm during a sensor jamming attack.

FIG. 2 is a block diagram of an example of a system 200 for triggering an alarm during a sensor jamming attack.

The system 200 includes a monitoring system control unit 110, a plurality of sensing unit 220-1 to 220-N (where N is any positive, non-zero integer greater than 1), a network 240, at least one listening device 250, a network 280, a monitoring application server 290, a central alarm station server 293.

The sensing unit 220-1 is configured to alert a monitoring system control unit 210 when the sensing unit 220-1 is under an RF jamming attack. The sensing unit 220-1 includes at least a sensor 221, an RF communication unit 222, a jamming detection unit 223, and a speaker 224. Though not shown, the sensing unit 220-1 also includes one or more processors, memory units, and computer instructions to perform actions of methods described in this specification. In some implementations, the jamming detection unit 223 is configured to generate an instruction that instructs the RF communication 222 or speaker to communicate with the monitoring system control unit 210 (or other component of the system 200) using a particular form of communication, and provide the generated instruction to the RF communication unit 222, the speaker, or both.

The sensor 221 can include any one of a plurality of different types of sensor that can generate data which can be used to detect a potential event at a property. In some implementations, the sensor 221 may include a contact sensor, a glass-break sensor, a motion sensor, a water sensor, a temperature sensor, a humidity sensor, a heat sensor, or the like.

The RF communication unit 222 can include an RF transmitter that can be used to broadcast sensor data generated by the sensor 221 using RF frequencies. In some implementations, the RF transmitter may only be configured to broadcast sensor data using a single low frequency to RF networks such as Z-wave networks, ZigBee networks, or the like. Alternatively, in other implementations, the RF transmitter may be used to transmit sensor data using a single high frequency to RF networks such as Wi-Fi networks, cellular networks, or the like.

In other implementations, the RF communication unit 222 can be configured to communicate using multiple different RF communication units. For example, the RF communication unit 222 can be configured to include a low frequency RF communication unit to broadcast sensor data using, for example, a Z-wave network and a high frequency RF communication unit to broadcast sensor data using, for example, a Wi-Fi network. In such implementations, the RF communication unit 222 may be configured to switch between the respective RF communication units in response to a determination that a primary RF frequency used by the RF communication unit 222 is jammed. For example, the RF communication unit 222 may initially be configured to broadcast sensor data using a lower frequencies of a Z-wave network and then switch to broadcasting sensor data using a high frequency of a Wi-Fi network. In such instances, the monitoring system control unit 210 may receive the sensor data transmitted using the higher RF frequencies that are not being jammed and then determine, based on the received sensor data, whether an alarm should be triggered.

The jamming detection unit 223 is configured to determine whether the sensing unit 220-1 is being jammed using RF frequencies. The jamming detection unit 223 may include an RF receiver that is configured to detect an amount of RF waves being broadcast in the vicinity of the RF receiver. For example, the RF receiver, or other component of the sensing unit, can be configured to determine whether power level of detected radio waves exceeds a predetermined threshold. The power level of the detected radio waves may be determined, based at least in part, on the amplitude of the detected radio waves. If the jamming detection unit 223 determines that the amount of RF waves detected by the RF receiver does not satisfy a predetermined threshold, then the jamming detection unit 223 may determine that the sensing unit 220-1 is not being subjected to a potential jamming event. Alternatively, if the jamming detection unit 223 determines that the amount of RF waves detected by the RF receiver of the jamming detection unit 223 does satisfy a predetermined threshold, then the jamming detection unit 223 may determine that the sensing unit 220-1 is being subjected to a potential jamming event. In yet other implementations, the jamming detection unit 223 may be configured to detect a potential jamming event in other ways. For example, the jamming detection unit 223 may be configured to detect a potential jamming event based on a determination that the RF communication unit 222 is unable to successfully establish a communication channel with the monitoring system control unit 210 (or other component of the monitoring system) in order to transmit sensor data to the monitoring system control unit 210 (or other component of the monitoring system).

The speaker 224 is configured to output audio tones 224*b*, 224*c* in response to a determination by the jamming detection unit 223 of a potential jamming event. The audio tones 224*b*, 224*c* may be detectable by a human ear. Alternatively, the audio tones 224*b*, 224*c* may be output at a frequency that is not detectable by a human ear. In some implementations, the audio tones 224*b*, 224*c* may include one or more audio tones that are devoid of any kind of information other than audio sound that is made by the tones produced by the speaker. Alternatively, for example, sensing unit 220-1 can encode information into a series of audio tones using varying pitches, varying durations, separated by varying amounts of time, or a combination thereof. In some implementations, an encoding scheme such as Morse code could be used to encode information into the audio tones 224*b*, 224*c*. Using such encoding techniques, the sensing unit 220-1 can encode data into the audio tones 224*b*, 224*c* indicating data associated with an event such as (i) a location (e.g., family room, kitchen, bedroom #1, bedroom #2, or the like), (ii) a sensed attribute of the property related to an event type (e.g., a door opening, window opening, glass broken, motion detected, temperature threshold exceeded, rate of temperature change threshold exceeded, moisture detected, smoke detected, carbon monoxide detected, or the like), (iii) a sensor identifier (e.g., sensor #1, motion_sensor #1, motion_sensor #1, contact sensor #1, or the like), a (iii) a combination thereof, or the like. Thus, the sensing unit 220-1 can notify the monitoring system control unit 210 of the occurrence of a potential jamming event without communicating over an RF network using the audio tones 224*b*, 224*c*.

In some implementations, the audio tones 224*b* generated by the speaker of the sensing unit 220-1 can be detected by microphone 210*a* of the monitoring system control unit 210. The monitoring system control unit 210 can determine, based on the audio tones detected by the microphone 210*a*, whether a potential jamming event is occurring at a property where the sensing unit 220-1 is installed. For example, in one implementation, the monitoring system control unit 210 may determine that a potential jamming event is occurring if any sensing unit of the plurality of sensing units 220-1 to 220-N starts generating audio tones such as audio tones 224*b*. Alternatively, in some implementations, the monitoring system control unit 210 may only determine that a potential jamming event is occurring in response to a determination that more than a threshold amount of sensing units 220-1 to 220-N are outputting audio tones such as audio tones 224*b*. In some implementations, the threshold number of sensing units that are required to be detected by the monitoring system control unit 210 may be configured by a legal occupant of the property where the sensing unit 220-1 is installed.

If the monitoring system control unit 210 determines, based on the detected audio tones 224*b*, that a potential jamming event is occurring, the monitoring system control unit 210 may perform one or more operations as described above (and below). For example, the monitoring system control unit 210 may output an audio alarm to try and scare away trespassers from the property where the sensing unit 220-1 is installed. Alternatively, or in addition, the monitoring system control unit 210 may transmit a notification to a monitoring application server 290, a central alarm station server 293, a combination thereof, or the like via the network 280 to notify the respective servers that a potential jamming event is taking place at the property where the sensing unit 220-1 is installed. The network 280 may include a LAN, a WAN, a cellular network, the Internet, or the like. In some implementations, the network 280 may a wireless network such as a Wi-Fi network, a cellular network, or the like. Alternatively, one or more portions of the network 280 may also be implemented using wired network such as an Ethernet network, a cable network, a fiber optic network, or the like. The network 280 may include a remote network.

For those implementation where the monitoring system control unit 210 notifies the monitoring application server 290, the monitoring application server 290 may determine whether the notification, combined with other sensor data obtained from the property 210, is indicative of a potential jamming event. If the monitoring application server 290 determines that a potential jamming event is occurring at the property where the sensing unit 220-1 is installed, then the monitoring application server 290 may transmit a message 290*a* to the central alarm station server 293 via the network 280 indicating that a potential jamming event is occurring at the property where the sensor 220-1 is installed. In response to receiving the message 290*a*, the central alarm station server 293 may dispatch law enforcement agents to the property where the sensor 220-1 is installed. In some implementations, the monitoring system control unit 210 may transmit the message 270 to the central alarm station server 293 without first transmitting the message 270 to the monitoring application server 290. In such instances, the central alarm station server 293 may dispatch law enforcement agents to the property where the sensor 220-1 is installed without first consulting the monitoring application server 290.

The monitoring system control unit 210 may also, or alternatively, perform a number of other operations in response to detecting a potential jamming event. For example, the monitoring system control unit 210 can perform one or more operations initiating video recording using an IP camera, flashing lights, deploying a drone, instructing neighbor's cameras to capture video of the vicinity of the property, or the like.

Determining, based on the audio tones detected by the microphone 210*a*, whether a potential jamming event is occurring at the property where the sensing unit 220-1 is installed may also include decoding the detected audio tones. For example, in some implementations, the monitoring system control unit 210 may decode information that was encoded into the audio tones 224*b* and determine that the sensor is broadcasting sensor data that is indicative of a potential alarm event (e.g., data indicating that a door was opened, data indicating that glass was broken, data indicating movement, or the like). Once the monitoring system control unit 210 obtains this decoded information combined with the monitoring system control unit 210 determining that a security code was not input to disarm the controlled home monitoring system 200, the monitoring system control unit 210 can perform one or more operations described above (and below) such as triggering an alarm, notifying one or more computers (e.g., monitoring application server 290, central alarm station server 293, a user device of a legitimate occupant of the property, or the like), initiating video recording using an IP camera, flashing lights, deploying a drone, instructing neighbor's cameras to capture video of the vicinity of the property, or the like.

In some implementations, the system 200 can include one or more other listening devices such as listening device 250. The listening device 250 can be used to detect audio tones 224*b*, 224*c* using a microphone 250*a*. Such listening devices may include, a home assistant device such as an Amazon Echo device, a Google Home device, or the like that has been integrated into the system 200. Alternatively, or in addition, other components of the system 200 can also be used as a listening device so long as the components include a microphone and a means to communicate with the monitoring system control unit 210 that is not being jammed such a Wi-Fi network. For example, the listening device may also include a camera that has a microphone and can communicate via RF frequencies such as the network 240. The network 240 may include a LAN, a WAN, a cellular network, the Internet, or the like. In some implementations, the network 240 may a Wi-Fi network. Alternatively, one or more portions of the network 240 may also be implemented using wired Ethernet connections.

In response to detecting audio tones 224*b*, 224*c* indicative of one or more sensors being jammed, the listening device 250 may notify the monitoring system control unit 210 of the detected audio tones. The notification 272 may be sent to the monitoring system control unit 210 using the network 240 via one or more wired connections such as a wired Ethernet connection. Alternatively, the notification 272 may be transmitted wirelessly to the monitoring system control unit 210 using a portion of network 240 that is implemented using an RF network that is not being jammed such as a Wi-Fi network.

Figure 3:
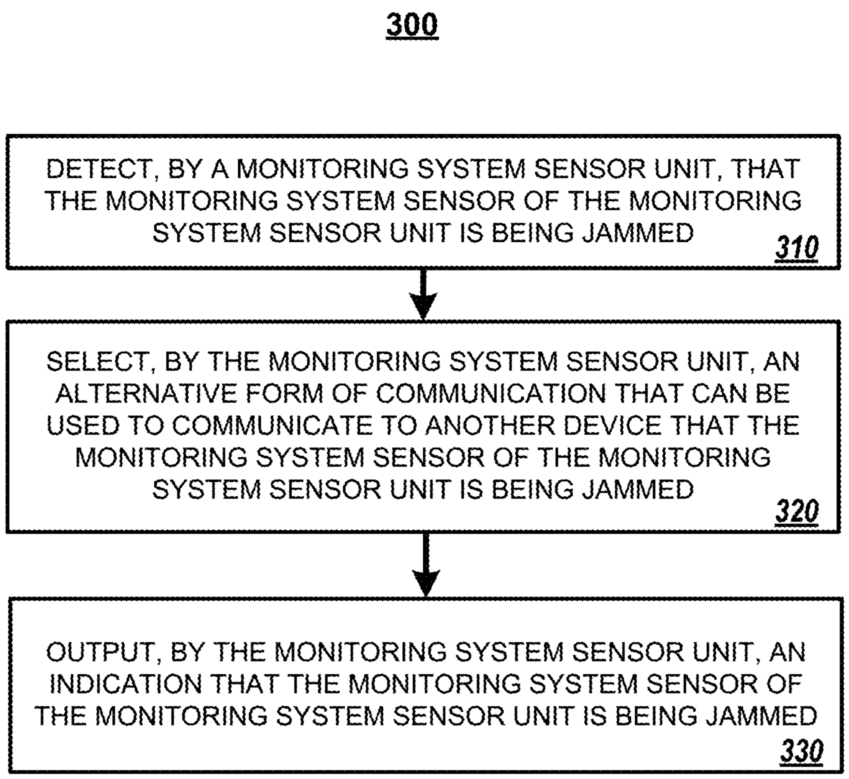
FIG. 3 is a flowchart of an example of a process for using a monitoring system sensor unit to communicate with another monitoring system component during a sensor jamming attack.

FIG. 3 is a flowchart of an example of a process 300 for using a monitoring system sensor unit to communicate with another monitoring system component during a sensor jamming attack. Generally, the process 300 may include detecting, by a monitoring system sensor unit, that the monitoring system sensor of the monitoring system sensor unit is being jammed (310), selecting, by the monitoring system sensor unit, an alternative form of communication that can be used to communicate to another device that the monitoring system sensor of the monitoring system sensor unit is being jammed (320), and output, by the monitoring system sensor unit, an indication that the monitoring system sensor of the monitoring system sensor unit is being jammed (330). For convenience, the process 300 will be described as being performed by a monitoring system sensor unit such as the sensing units 120, 121, 122, 123, 124, 125, 126, 127, 128, 129 of system 100 described above or sensing unit 220-1 of system 200 described above.

The monitoring system sensor unit begins process 300 by detecting 310 that the monitoring system sensor of the monitoring system sensor unit is being jammed. Detecting, by the monitoring system sensor unit, may include using an RF receiver to detect an amount of RF waves being broadcast in the vicinity of the RF receiver. For example, the RF receiver, or other component of the sensing unit, can be configured to determine whether power level of detected radio waves exceeds a predetermined threshold. The power level of the detected radio waves may be determined, based at least in part, on the amplitude of the detected radio waves.

The monitoring system sensor may then compare the amount of detected RF waves to a predetermined threshold. If the monitoring system sensor unit determines that the amount of RF waves detected by the RF receiver does not satisfy a predetermined threshold, then the monitoring system sensor unit may determine that the monitoring system sensor unit is not being subjected to a potential jamming event. Alternatively, if the monitoring system sensor unit determines that the amount of RF waves detected by the RF receiver of the monitoring system sensor unit does satisfy a predetermined threshold, then the monitoring system sensor unit may determine that the monitoring system sensor unit is being subjected to a potential jamming event.

The monitoring system sensor unit can select 320 an alternative form of communication that can be used to communicate to another device that the monitoring system sensor of the monitoring system sensor unit is being jammed. Selecting an alternative form of communication may include, for example, selecting a speaker to output one or more audio tones. Alternatively, in some implementations where the monitoring system sensor unit is configured with multiple RF communication units, selecting an alternative communication means may include, for example, selecting between (i) a speaker that outputs audio tones and an RF communication unit that can broadcast on a different RF frequency than the jammed frequency. In some implementations, the monitoring system sensor may select each available alternative form of communication for use in transmitting data in response to a determination that the monitoring system sensor data is being jammed.

The monitoring system sensor unit can output 330 an indication that the monitoring system sensor of the monitoring system sensor unit is being jammed. Outputting an indication that the monitoring system sensor is being jammed may include, for example, outputting one or more audio tones. In some implementations, the outputted audio tones may be devoid of any kind of information other than audio sound that is made by the tones produced by an output speaker.

Alternatively, for example, the monitoring system sensor unit can output audio tones that have been encoded with information using a series of audio tones using varying pitches, varying durations, separated by varying amounts of time, or a combination thereof. In some implementations, an encoding scheme such as Morse code could be used to encode information into the audio tones. Information encoded into the audio tones may include, for example, data associated with an event such as (i) a location (e.g., family room, kitchen, bedroom #1, bedroom #2, or the like), (ii) event type (e.g., door open, window open, glass broken, motion detected, temperature threshold exceeded, rate of temperature change threshold exceeded, water detected, or the like), (iii) a sensor identifier (e.g., sensor #1, motion_sensor #1, motion_sensor #1, contact sensor #1, or the like), a (iii) a combination thereof, or the like.

Figure 4:
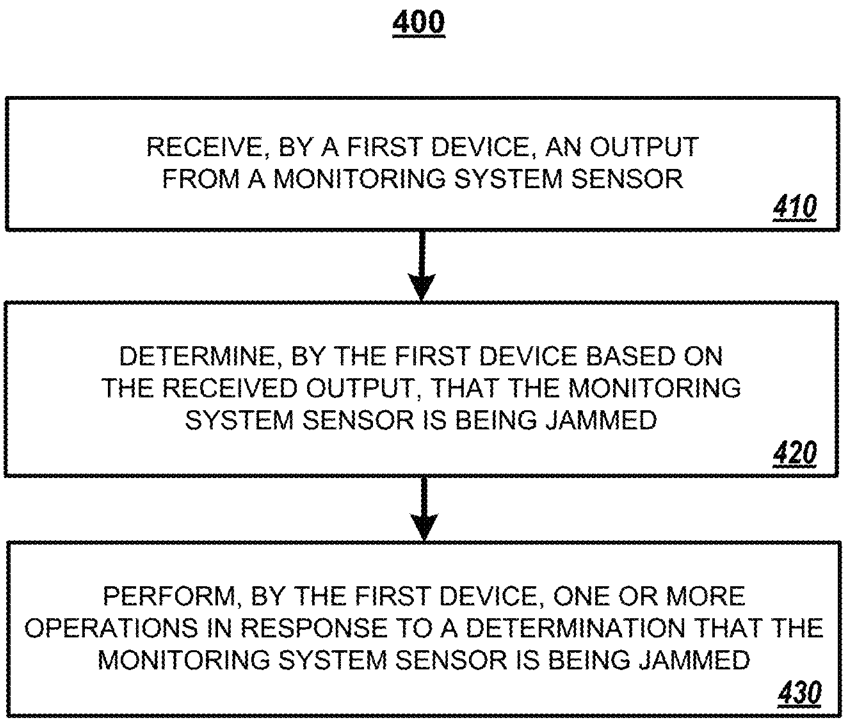
FIG. 4 is a flowchart of an example of a process for triggering an alarm during a sensor jamming attack based on a communication from a monitoring system sensor unit.

FIG. 4 is a flowchart of an example of a process 400 for triggering an alarm during a sensor jamming attack based on a communication from a monitoring system sensor unit. Generally, the process 400 may include receiving, by a first device, an output from a monitoring system sensor (410), determining, by the first device based on the received output, that the monitoring system sensor is being jammed (420), performing, by the first device, one or more operations in response to a determination that the monitoring system sensor is being jammed (430). For convenience, the process 400 will be described as being performed by monitoring system control unit such as the monitoring system control units 110 and 220 described with reference to FIGS. 1 and 2 above. In some implementations, the process 400 may also be performed by any listening device described with reference to FIGS. 1 and 2 above.

The monitoring system control unit can begin process 400 when a first device of the system receives 410 an output from a monitoring system sensor. For example, the monitoring system control unit can detect one or more audio tones output from the speaker of the monitoring system sensor unit.

The monitoring system control unit can determine 420, based on the received output, that the monitoring system sensor is being jammed. For example, in one implementation, the monitoring system control unit may determine that a monitoring system sensor is being jammed if any sensing unit of a plurality of sensing units installed at a property starts generating audio tones. Alternatively, in some implementations, the monitoring system control unit may only determine that a potential jamming event is occurring in response to a determination that more than a threshold amount of sensing units installed at the property are outputting audio tones. In some implementations, the threshold number of sensing units that are required to be detected by the monitoring system control unit may be configured by a legal occupant of the property.

Alternatively, or in addition, determining, based on the received output, that the monitoring system sensor is being jammed may include decoding information encoded into the audio tones output by the monitoring system sensor unit. The monitoring system control unit may then determine that a potential jamming event is determined based on the decoded information.

The monitoring system control unit can perform 430 one or more operations in response to a determination that the monitoring system sensor unit is being jammed. For example, the monitoring system control unit may output an audio alarm to try and scare away trespassers from the property where the monitoring system sensor unit is installed. Alternatively, or in addition, the monitoring system control unit may transmit a notification to a central alarm station server via a network to (i) notify the respective servers that a potential jamming event is taking place at the property where the monitoring system sensor unit is installed and (ii) instruct one or more of the respective servers to trigger an alarm. In response to receiving the notification, the central alarm station server may dispatch law enforcement agents to the property where the monitoring system sensor unit is installed.

The monitoring system control unit may also, or alternatively, perform a number of other operations in response to detecting a potential jamming event. For example, the monitoring system control unit can perform one or more operations initiating video recording using an IP camera, flashing lights, deploying a drone, instructing neighbor's cameras to capture video of the vicinity of the property, or the like.

Figure 5:
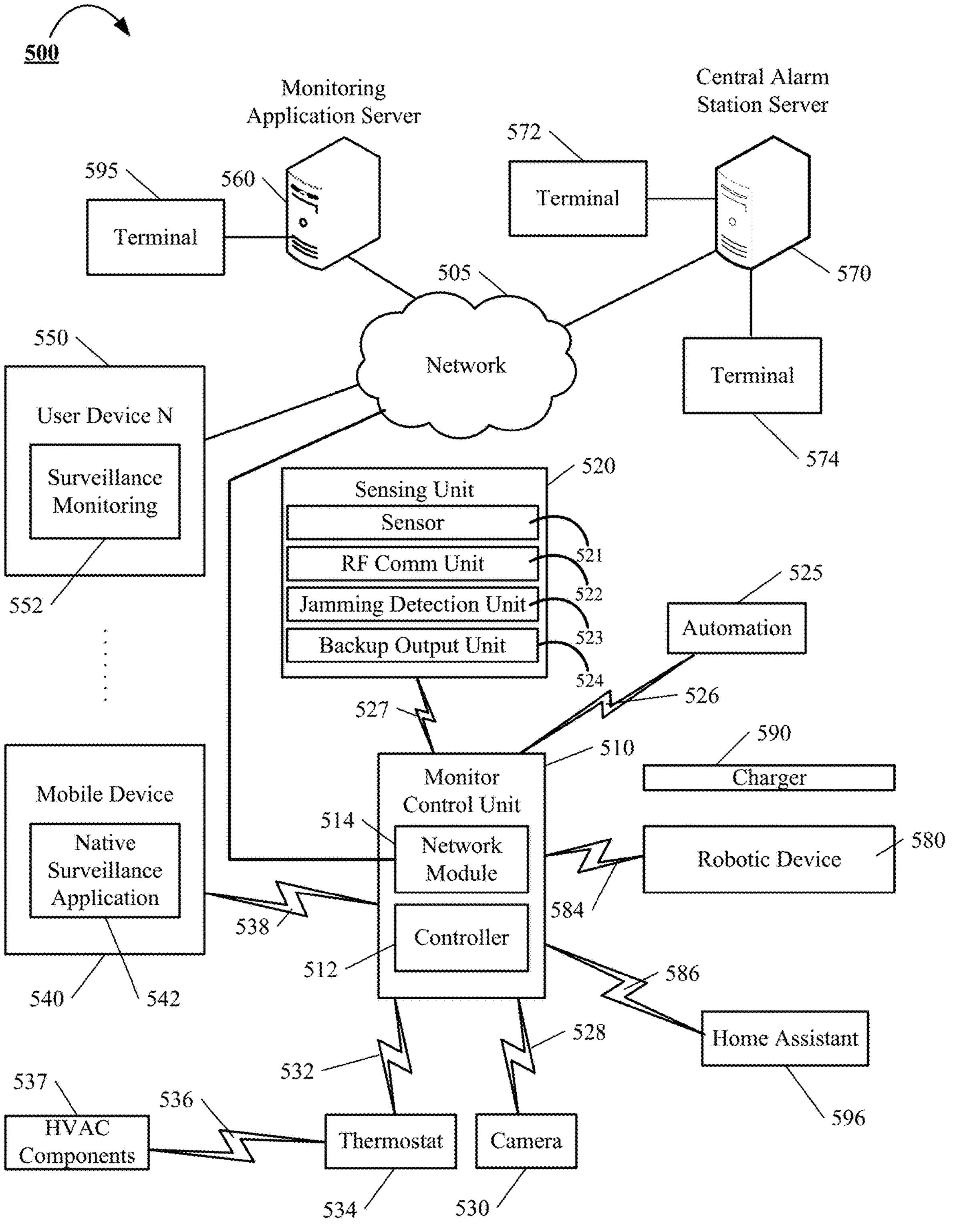
FIG. 5 is a block diagram of components that can be used to implement a system that triggers an alarm during a sensor jamming attack.

FIG. 5 is a block diagram of components that can be used to implement a system that triggers an alarm during a sensor jamming attack.

The electronic system 500 includes a network 505, a monitoring system control unit 510, one or more user devices 540, 550, a monitoring application server 560, and a central alarm station server 570. In some examples, the network 505 facilitates communications between the monitoring system control unit 510, the one or more user devices 540, 550, the monitoring application server 560, and the central alarm station server 570.

The network 505 is configured to enable exchange of electronic communications between devices connected to the network 505. For example, the network 505 may be configured to enable exchange of electronic communications between the monitoring system control unit 510, the one or more user devices 540, 550, the monitoring application server 560, and the central alarm station server 570. The network 505 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 505 may include multiple networks or subnetworks, each of which may include, for example, a wired or wireless data pathway. The network 505 may include a circuit-switched network, a packet-switched data network, or any other network able to carry electronic communications (e.g., data or voice communications). For example, the network 505 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 505 may include one or more networks that include wireless data channels and wireless voice channels. The network 505 may be a wireless network, a broadband network, or a combination of networks including a wireless network and a broadband network.

The monitoring system control unit 510 includes a controller 512 and a network module 514. The controller 512 is configured to control a monitoring system (e.g., a home alarm or security system) that includes the monitoring system control unit 510. In some examples, the controller 512 may include a processor or other control circuitry configured to execute instructions of a program that controls operation of an alarm system. In these examples, the controller 512 may be configured to receive input from sensors, detectors, or other devices included in the alarm system and control operations of devices included in the alarm system or other household devices (e.g., a thermostat, an appliance, lights, etc.). For example, the controller 512 may be configured to control operation of the network module 514 included in the monitoring system control unit 510.

The network module 514 is a communication device configured to exchange communications over the network 505. The network module 514 may be a wireless communication module configured to exchange wireless communications over the network 505. For example, the network module 514 may be a wireless communication device configured to exchange communications over a wireless data channel and a wireless voice channel. In this example, the network module 514 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 514 also may be a wired communication module configured to exchange communications over the network 505 using a wired connection. For instance, the network module 514 may be a modem, a network interface card, or another type of network interface device. The network module 514 may be an Ethernet network card configured to enable the monitoring system control unit 510 to communicate over a local area network and/or the Internet. The network module 514 also may be a voiceband modem configured to enable the alarm panel to communicate over the telephone lines of Plain Old Telephone Systems (POTS).

The monitoring system that includes the monitoring system control unit 510 includes at least one sensing units 520. In some implementations, the monitoring system may include multiple sensing units 520. Each sensing unit 520 may include at least one sensor (or detector) 521, an RF communication unit 522, a jamming detection unit 523, or a back-up output unit 524. The back-up output unit 524 may include (i) a speaker capable outputting audio tones, (ii) an alternative RF communication unit that is capable of broadcasting sensor data using a different RF frequency that the primary RF communication unit 522, or (iii) a combination thereof.

The sensor 521 of the sensing unit 520 may include a contact sensor, a motion sensor, a glass break sensor, or any other type of sensor included in an alarm system or security system. The sensor 521 also may include an environmental sensor, such as a temperature sensor, a water sensor, a rain sensor, a wind sensor, a light sensor, a smoke detector, a carbon monoxide detector, an air quality sensor, etc. The sensor 521 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 521 may include a radio-frequency identification (RFID) sensor that identifies a particular article that includes a pre-assigned RFID tag. Each respective type of sensor (or detector) is configured to generate data which can be used to detect a potential event at a property.

The RF communication unit 522 can include an RF transmitter that can be used to broadcast sensor data generated by the sensor 521 using RF frequencies. In some implementations, the RF transmitter may only be configured to be broadcast sensor data using a single low frequency RF networks such as Z-wave networks, ZigBee networks, or the like. Alternatively, in other implementations, the RF transmitter may be used to transmit sensor data using a single high frequency RF network such as Wi-Fi networks, cellular networks, or the like.

The jamming detection unit 523 is configured to determine whether the sensor 521 is being jammed using RF frequencies. The jamming detection unit 523 may include an RF receiver that is configured to detect an amount of RF waves being broadcast in the vicinity of the RF receiver. For example, the RF receiver, or other component of the sensing unit, can be configured to determine whether power level of detected radio waves exceeds a predetermined threshold. The power level of the detected radio waves may be determined, based at least in part, on the amplitude of the detected radio waves.

If the jamming detection unit 523 determines that the amount of RF waves detected by the RF receiver does not satisfy a predetermined threshold, then the jamming detection unit 523 may determine that the sensing unit 520 is not being subjected to a potential jamming event. Alternatively, if the jamming detection unit 523 determines that the amount of RF waves detected by the RF receiver of the jamming detection unit 523 does satisfy a predetermined threshold, then the jamming detection unit 523 may determine that the sensing unit 520 is being subjected to a potential jamming event.

The backup output unit 524 is configured to enable the sensing unit 520 to communicate with other components of the system 500 such as the monitoring system control unit 510, a home assistant 596, or one or more other listening devices such as a microphone on a camera 530. In some implementations, the backup output unit 524 may include a speaker that can output audio tones in response to a determination by the jamming detection unit 523 that he sensor 521 of the sensing unit 520 is being jammed using an RF jamming device. Alternatively, or in addition, the backup output unit 524 may also include an additional RF communication unit that is capable of broadcasting generated sensor data using an RF frequency that is different than a primary RF frequency used by the RF communication unit 522.

The monitoring system control unit 510 communicates with the module 525 and the camera 530 to perform surveillance or monitoring. The module 525 is connected to one or more devices that enable home automation control. For instance, the module 525 may be connected to one or more lighting systems and may be configured to control operation of the one or more lighting systems. Also, the module 525 may be connected to one or more electronic locks at the property and may be configured to control operation of the one or more electronic locks (e.g., control Z-Wave locks using wireless communications in the Z-Wave protocol. Further, the module 525 may be connected to one or more appliances at the property and may be configured to control operation of the one or more appliances. The module 525 may include multiple modules that are each specific to the type of device being controlled in an automated manner. The module 525 may control the one or more devices based on commands received from the monitoring system control unit 510. For instance, the module 525 may cause a lighting system to illuminate an area to provide a better image of the area when captured by a camera 530.

In some implementations, the monitoring system control unit 510 can include a microphone that is configured to detect the audio tones output by the backup output unit 524 of a sensing unit 520. The monitoring system control unit 510 may determine, based on the detected audio tones, whether a potential jamming event is occurring. In some implementations, the monitoring system control unit 510 may determine that a potential jamming event is occurring if audio tones are detected from a single sensing unit 520. Alternatively, in some implementations, the monitoring system control unit 510 may only determine that a potential jamming event is occurring if audio tones are detected from more than a threshold number of sensing units 520. If the monitoring system control unit 510 determines that a potential jamming event is occurring, the monitoring system control unit 510 may perform one or more operations such as triggering an alarm. Other operations that may be performed by the monitoring system control unit 510 are discussed hereinabove.

The system 500 may also include a home assistant 596. The home assistant 596 may include a microphone that can be used to detect one or more audio tones generated by one or more sensing units 520. In response to detecting audio tones generated by one or more sensing units, the home assistant 596 may transmit a notification to the monitoring system control unit 510 indicating that a potential jamming event has occurred.

The camera 530 may be a video/photographic camera or other type of optical sensing device configured to capture images. For instance, the camera 530 may be configured to capture images of an area within a building monitored by the monitoring system control unit 510. The camera 530 may be configured to capture single, static images of the area and also video images of the area in which multiple images of the area are captured at a relatively high frequency (e.g., thirty images per second). The camera 530 may be controlled based on commands received from the monitoring system control unit 510.

The camera 530 may be triggered by several different types of techniques. For instance, a Passive Infra Red (PIR) motion sensor may be built into the camera 530 and used to trigger the camera 530 to capture one or more images when motion is detected. The camera 530 also may include a microwave motion sensor built into the camera and used to trigger the camera 530 to capture one or more images when motion is detected. The camera 530 may have a "normally open" or "normally closed" digital input that can trigger capture of one or more images when external sensors (e.g., the sensing unit 520, PIR, door/window, etc.) detect motion or other events. In some implementations, the camera 530 receives a command to capture an image when external devices detect motion or another potential alarm event. The camera 530 may receive the command from the controller 512 or directly from one of the sensing unit 520.

In some examples, the camera 530 triggers integrated or external illuminators (e.g., Infra Red, Z-wave controlled "white" lights, lights controlled by the module 525, etc.) to improve image quality when the scene is dark. An integrated or separate light sensor may be used to determine if illumination is desired and may result in increased image quality.

The camera 530 may be programmed with any combination of time/day schedules, system "arming state", or other variables to determine whether images should be captured or not when triggers occur. The camera 530 may enter a low-power mode when not capturing images. In this case, the camera 530 may wake periodically to check for inbound messages from the controller 512. The camera 530 may be powered by internal, replaceable batteries if located remotely from the monitoring system control unit 510. The camera 530 may employ a small solar cell to recharge the battery when light is available. Alternatively, the camera 530 may be powered by the controller's 512 power supply if the camera 530 is co-located with the controller 512.

In some implementations, the camera 530 communicates directly with the monitoring application server 560 over the Internet. In these implementations, image data captured by the camera 530 does not pass through the monitoring system control unit 510 and the camera 530 receives commands related to operation from the monitoring application server 560.

The system 500 also includes a thermostat 534 to perform dynamic environmental control at the property. The thermostat 534 is configured to monitor temperature and/or energy consumption of an HVAC system associated with the thermostat 534, and is further configured to provide control of environmental (e.g., temperature) settings. In some implementations, the thermostat 534 can additionally or alternatively receive data relating to activity at a property and/or environmental data at a property, e.g., at various locations indoors and outdoors at the property. The thermostat 534 can directly measure energy consumption of the HVAC system associated with the thermostat, or can estimate energy consumption of the HVAC system associated with the thermostat 534, for example, based on detected usage of one or more components of the HVAC system associated with the thermostat 534. The thermostat 534 can communicate temperature and/or energy monitoring information to or from the monitoring system control unit 510 and can control the environmental (e.g., temperature) settings based on commands received from the monitoring system control unit 510.

In some implementations, the thermostat 534 is a dynamically programmable thermostat and can be integrated with the monitoring system control unit 510. For example, the dynamically programmable thermostat 534 can include the monitoring system control unit 510, e.g., as an internal component to the dynamically programmable thermostat 534. In addition, the monitoring system control unit 510 can be a gateway device that communicates with the dynamically programmable thermostat 534.

A module 537 is connected to one or more components of an HVAC system associated with a property, and is configured to control operation of the one or more components of the HVAC system. In some implementations, the module 537 is also configured to monitor energy consumption of the HVAC system components, for example, by directly measuring the energy consumption of the HVAC system components or by estimating the energy usage of the one or more HVAC system components based on detecting usage of components of the HVAC system. The module 537 can communicate energy monitoring information and the state of the HVAC system components to the thermostat 534 and can control the one or more components of the HVAC system based on commands received from the thermostat 534.

The system 500 further includes one or more robotic devices 580. The robotic device 580 may be any type of robot that is capable of moving and taking actions that assist in security monitoring. For example, the robotic device 580 may include a drone that is capable of moving throughout a property based on automated control technology and/or user input control provided by a user. In this example, the drone may be able to fly, roll, walk, or otherwise move about the property. The drone may include a helicopter type device (e.g., a quad copter), rolling helicopter type device (e.g., a roller copter device that can fly and also roll along the ground, walls, or ceiling) and a land vehicle type device (e.g., an automated car that drives around a property). In some cases, the robotic device 580 may be a robotic device that is intended for other purposes and is merely associated with the monitoring system 500 for use in appropriate circumstances. For instance, a robotic vacuum cleaner device may be associated with the monitoring system 500 as one of the robotic devices 580 and may be controlled to take action responsive to monitoring system events.

In some examples, the robotic device 580 may automatically navigate within a property. In these examples, the robotic device 580 may include sensors and control processors that guide movement of the robotic device 580 within the property. For instance, the robotic device 580 may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic device 580 may include control processors that process output from the various sensors and control the robotic device 580 to move along a path that reaches the desired destination and avoids obstacles. In this regard, the control processors detect walls or other obstacles in the property and guide movement of the robotic device 580 in a manner that avoids the walls and other obstacles.

In addition, the robotic device 580 may store data that describes attributes of the property. For instance, the robotic device 580 may store a floorplan and/or a three-dimensional model of the property that enables the robotic device 580 to navigate the property. During initial configuration, the robotic device 580 may receive the data describing attributes of the property, determine a frame of reference to the data (e.g., a home or reference location in the property), and navigate the property based on the frame of reference and the data describing attributes of the property. Further, initial configuration of the robotic device 580 also may include learning of one or more navigation patterns in which a user provides input to control the robotic device 580 to perform a specific navigation action (e.g., fly to an upstairs bedroom and spin around while capturing video and then return to a home charging base). In this regard, the robotic device 580 may learn and store the navigation patterns such that the robotic device 580 may automatically repeat the specific navigation actions upon a later request.

In some examples, the robotic device 580 may include data capture and recording devices. In these examples, the robotic device 580 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the property and users in the property. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic device 580 to take and store a biometric sample that can be used to identify the person (e.g., a biometric sample with DNA that can be used for DNA testing).

In some implementations, the robotic device 580 may include one or more output devices. In these implementations, the robotic device 580 may include one or more displays, one or more speakers, one or more projectors, and/or any type of output devices that allow the robotic device 580 to communicate information to a nearby user. The one or more projectors may include projectors that project a two-dimensional image onto a surface (e.g., wall, floor, or ceiling) and/or holographic projectors that project three-dimensional holograms into a nearby space.

The robotic device 580 also may include a communication module that enables the robotic device 580 to communicate with the monitoring system control unit 510, each other, and/or other devices. The communication module may be a wireless communication module that allows the robotic device 580 to communicate wirelessly. For instance, the communication module may be a Wi-Fi module that enables the robotic device 580 to communicate over a local wireless network at the property. The communication module may further may be a 500 MHz wireless communication module that enables the robotic device 580 to communicate directly with the monitoring system control unit 510. Other types of short-range wireless communication protocols, such as Bluetooth, Bluetooth LE, Z-Wave, ZigBee, etc., may be used to allow the robotic device 580 to communicate with other devices in the property.

The robotic device 580 further may include processor and storage capabilities. The robotic device 580 may include any suitable processing devices that enable the robotic device 580 to operate applications and perform the actions described throughout this disclosure. In addition, the robotic device 580 may include solid state electronic storage that enables the robotic devices 580 to store applications, configuration data, collected sensor data, and/or any other type of information available to the robotic device 580.

The robotic device 580 is associated with a charging station 590. The charging stations 590 may be located at predefined home base or reference locations in the property. The robotic device 580 may be configured to navigate to the charging station 590 after completion of tasks needed to be performed for the monitoring system 500. For instance, after completion of an investigation of a potential jamming event or upon instruction by the monitoring system control unit 510, the robotic device 580 may be configured to automatically fly to and land on a charging station 590. In this regard, the robotic device 580 may automatically maintain a fully charged battery in a state in which the robotic device 580 are ready for use by the monitoring system 500.

The charging station 590 may be contact based charging stations and/or wireless charging stations. For contact based charging stations, the robotic device 580 may have readily accessible points of contact that the robotic device 580 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic device 580 may charge through a wireless exchange of power. In these cases, the robotic device 580 need only locate itself closely enough to the wireless charging stations for the wireless exchange of power to occur. In this regard, the positioning needed to land at a predefined home base or reference location in the property may be less precise than with a contact based charging station. Based on the robotic device 580 landing at a wireless charging station, the wireless charging station outputs a wireless signal that the robotic device 580 receives and converts to a power signal that charges a battery maintained on the robotic device 580.

The sensing unit 520, the module 525, the camera 530, the thermostat 534, the robotic device 580, and the home assistant 596 can communicate with the controller 512 over communication links 527, 526, 528, 532, 538, 584, and 586. The communication links 527, 526, 528, 532, 538, 584, and 586 may be a wired or wireless data pathway configured to transmit signals from the sensing unit 520, the module 525, the camera 530, the thermostat 534, the robotic device 580, and the home assistant 596 to the controller 512. The sensing unit 520, the module 525, the camera 530, the thermostat 534, the robotic device 580, and the home assistant 596 may continuously transmit sensed values to the controller 512, periodically transmit sensed values to the controller 512, or transmit sensed values to the controller 512 in response to a change in a sensed value.

The communication links 527, 526, 528, 532, 538, 584, and 586 may include a local network. The sensing unit 520, the module 525, the camera 530, the thermostat 534, the robotic device 580, the home assistant 596, and the controller 512 may exchange data and commands over the local network. The local network may include 802.11 "Wi-Fi" wireless Ethernet (e.g., using low-power Wi-Fi chipsets), Z-Wave, ZigBee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring application server 560 is an electronic device configured to provide monitoring services by exchanging electronic communications with the monitoring system control unit 510, the one or more user devices 540, 550, and the central alarm station server 570 over the network 505. For example, the monitoring application server 560 may be configured to monitor events (e.g., alarm events) generated by the monitoring system control unit 510. In this example, the monitoring application server 560 may exchange electronic communications with the network module 514 included in the monitoring system control unit 510 to receive information regarding events (e.g., alarm events) detected by the monitoring system control unit 510. The monitoring application server 560 also may receive information regarding events (e.g., alarm events) from the one or more user devices 540, 550.

In some examples, the monitoring application server 560 may route alarm data received from the network module 514 or the one or more user devices 540, 550 to the central alarm station server 570. For example, the monitoring application server 560 may transmit the alarm data to the central alarm station server 570 over the network 505.

The monitoring application server 560 may store sensor and image data received from the monitoring system and perform analysis of sensor and image data received from the monitoring system. Based on the analysis, the monitoring application server 560 may communicate with and control aspects of the monitoring system control unit 510 or the one or more user devices 540, 550.

The central alarm station server 570 is an electronic device configured to provide alarm monitoring service by exchanging communications with the monitoring system control unit 510, the one or more mobile devices 540, 550, and the monitoring application server 560 over the network 505. For example, the central alarm station server 570 may be configured to monitor alarm events generated by the monitoring system control unit 510. In this example, the central alarm station server 570 may exchange communications with the network module 514 included in the monitoring system control unit 510 to receive information regarding alarm events detected by the monitoring system control unit 510. The central alarm station server 570 also may receive information regarding alarm events from the one or more mobile devices 540, 550 and/or the monitoring application server 560.

The central alarm station server 570 is connected to multiple terminals 572 and 574. The terminals 572 and 574 may be used by operators to process alarm events. For example, the central alarm station server 570 may route alarm data to the terminals 572 and 574 to enable an operator to process the alarm data. The terminals 572 and 574 may include general-purpose computers (e.g., desktop personal computers, workstations, or laptop computers) that are configured to receive alarm data from a server in the central alarm station server 570 and render a display of information based on the alarm data. For instance, the controller 512 may control the network module 514 to transmit, to the central alarm station server 570, alarm data indicating that a sensing unit 520 detected a door opening when the monitoring system was armed. The central alarm station server 570 may receive the alarm data and route the alarm data to the terminal 572 for processing by an operator associated with the terminal 572. The terminal 572 may render a display to the operator that includes information associated with the alarm event (e.g., the name of the user of the alarm system, the address of the building the alarm system is monitoring, the type of alarm event, etc.) and the operator may handle the alarm event based on the displayed information.

In some implementations, the terminals 572 and 574 may be mobile devices or devices designed for a specific function. Although FIG. 5 illustrates two terminals for brevity, actual implementations may include more (and, perhaps, many more) terminals.

The one or more user devices 540, 550 are devices that host and display user interfaces. For instance, the user device 540 is a mobile device that hosts one or more native applications (e.g., the native surveillance application 542). The user device 540 may be a cellular phone or a non-cellular locally networked device with a display. The user device 540 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 540 may perform functions unrelated to the monitoring system, such as placing personal telephone calls, playing music, playing video, displaying pictures, browsing the Internet, maintaining an electronic calendar, etc.

The user device 540 includes a native surveillance application 542. The native surveillance application 542 refers to a software/firmware program running on the corresponding mobile device that enables the user interface and features described throughout. The user device 540 may load or install the native surveillance application 542 based on data received over a network or data received from local media. The native surveillance application 542 runs on mobile devices platforms, such as iPhone, iPod touch, Blackberry, Google Android, Windows Mobile, etc. The native surveillance application 542 enables the user device 540 to receive and process image and sensor data from the monitoring system.

The user device 550 may be a general-purpose computer (e.g., a desktop personal computer, a workstation, or a laptop computer) that is configured to communicate with the monitoring application server 560 and/or the monitoring system control unit 510 over the network 505. The user device 550 may be configured to display a surveillance monitoring user interface 552 that is generated by the user device 550 or generated by the monitoring application server 560. For example, the user device 550 may be configured to display a user interface (e.g., a web page) provided by the monitoring application server 560 that enables a user to perceive images captured by the camera 530 and/or reports related to the monitoring system. Although FIG. 5 illustrates two user devices for brevity, actual implementations may include more (and, perhaps, many more) or fewer user devices.

In some implementations, the one or more user devices 540, 550 communicate with and receive monitoring system data from the monitoring system control unit 510 using the communication link 538. For instance, the one or more user devices 540, 550 may communicate with the monitoring system control unit 510 using various local wireless protocols such as Wi-Fi, Bluetooth, Z-Wave, ZigBee, HomePlug (Ethernet over powerline), or wired protocols such as Ethernet and USB, to connect the one or more user devices 540, 550 to local security and automation equipment. The one or more user devices 540, 550 may connect locally to the monitoring system and its sensors and other devices. The local connection may improve the speed of status and control communications because communicating through the network 505 with a remote server (e.g., the monitoring application server 560) may be significantly slower.

Although the one or more user devices 540, 550 are shown as communicating with the monitoring system control unit 510, the one or more user devices 540, 550 may communicate directly with the sensors and other devices controlled by the monitoring system control unit 510. In some implementations, the one or more user devices 540, 550 replace the monitoring system control unit 510 and perform the functions of the monitoring system control unit 510 for local monitoring and long range/offsite communication.

In other implementations, the one or more user devices 540, 550 receive monitoring system data captured by the monitoring system control unit 510 through the network 505. The one or more user devices 540, 550 may receive the data from the monitoring system control unit 510 through the network 505 or the monitoring application server 560 may relay data received from the monitoring system control unit 510 to the one or more user devices 540, 550 through the network 505. In this regard, the monitoring application server 560 may facilitate communication between the one or more user devices 540, 550 and the monitoring system.

In some implementations, the one or more user devices 540, 550 may be configured to switch whether the one or more user devices 540, 550 communicate with the monitoring system control unit 510 directly (e.g., through link 538) or through the monitoring application server 560 (e.g., through network 505) based on a location of the one or more user devices 540, 550. For instance, when the one or more user devices 540, 550 are located close to the monitoring system control unit 510 and in range to communicate directly with the monitoring system control unit 510, the one or more user devices 540, 550 use direct communication. When the one or more user devices 540, 550 are located far from the monitoring system control unit 510 and not in range to communicate directly with the monitoring system control unit 510, the one or more user devices 540, 550 use communication through the monitoring application server 560.

Although the one or more user devices 540, 550 are shown as being connected to the network 505, in some implementations, the one or more user devices 540, 550 are not connected to the network 505. In these implementations, the one or more user devices 540, 550 communicate directly with one or more of the monitoring system components and no network (e.g., Internet) connection or reliance on remote servers is needed.

In some implementations, the one or more user devices 540, 550 are used in conjunction with only local sensors and/or local devices in a house. In these implementations, the system 500 only includes the one or more user devices 540, 550, the sensing unit 520, the module 525, the camera 530, the robotic device 580, and the home assistant 596. The one or more user devices 540, 550 receive data directly from the sensing unit 520, the module 525, the camera 530, and robotic device 580, and the home assistant 596 and sends data directly to the sensing unit 520, the module 525, the camera 530, the robotic device 580, and the homes assistant 596. The one or more user devices 540, 550 provide the appropriate interfaces/processing to provide visual surveillance and reporting.

In other implementations, the system 500 further includes network 505 and the sensing unit 520, the module 525, the camera 530, the thermostat 534, the robotic device 580, and the homes assistant 596 are configured to communicate sensor and image data to the one or more user devices 540, 550 over network 505 (e.g., the Internet, cellular network, etc.). In yet another implementation, the sensing unit 520, the module 525, the camera 530, the thermostat 534, the robotic device 580 (or a component, such as a bridge/router) are intelligent enough to change the communication pathway from a direct local pathway when the one or more user devices 540, 550 are in close physical proximity to the sensing unit 520, the module 525, the camera 530, the thermostat 534, the robotic device 580, and the home assistant 596 to a pathway over network 505 when the one or more user devices 540, 550 are farther from the sensing unit 520, the module 525, the camera 530, the thermostat 534, the robotic device 580, and the home assistant 596. In some examples, the system leverages GPS information from the one or more user devices 540, 550 to determine whether the one or more user devices 540, 550 are close enough to the sensing unit 520, the module 525, the camera 530, the thermostat 534, the robotic device 580 to use the direct local pathway or whether the one or more user devices 540, 550 are far enough from the sensing unit 520, the module 525, the camera 530, the thermostat 534, the robotic device 580, and the home assistant 596 that the pathway over network 505 is required. In other examples, the system leverages status communications (e.g., pinging) between the one or more user devices 540, 550 and the sensing unit 520, the module 525, the camera 530, the thermostat 534, the robotic device 580 to determine whether communication using the direct local pathway is possible. If communication using the direct local pathway is possible, the one or more user devices 540, 550 communicate with the sensing unit 520, the module 525, the camera 530, the thermostat 534, the robotic device 580, and the home assistant 596 using the direct local pathway. If communication using the direct local pathway is not possible, the one or more user devices 540, 550 communicate with the sensing unit 520, the module 525, the camera 530, the thermostat 534, the robotic devices 580, and the home assistant 596 using the pathway over network 505.

The invention claimed is:

1. A computing device comprising one or more processors and one or more storage media on which are stored instructions that are operable, when executed by the one or more processors, to cause the one or more processors to perform operations comprising:

determining to communicate data to a device at a property;

determining that a jamming event is occurring at the property for a first communication mode; and in response to determining that the jamming event is occurring at the property for the first communication mode, using a second communication mode that is different from the first communication mode to communicate the data to the device at the property.

2. The computing device of claim 1, wherein the data comprises sensor data generated by a sensor at the property.

3. The computing device of claim 1, the operations comprising:

selecting, from a plurality of communication modes, the second communication mode for communicating the data to the device at the property in response to determining that no jamming event is occurring for the second communication mode.

4. The computing device of claim 1, wherein the device at the property is one of a plurality of devices at the property, the operations comprising:

transmitting, to the plurality of devices at the property, instructions to communicate using the second communication mode.

5. The computing device of claim 1, wherein the device at the property is one of a plurality of devices at the property, the operations comprising:

transmitting, to the plurality of devices at the property, data indicating that the jamming event is occurring for the first communication mode.

6. The computing device of claim 1, wherein using the second communication mode that is different from the first communication mode to communicate the data to the device at the property comprises encoding the data into one or more audio tones representing the data.

7. The computing device of claim 6, wherein encoding the data into the one or more audio tones representing the data comprises encoding the data using at least one of pitches, duration, periodicities, frequencies, or patterns of the audio tones.

8. The computing device of claim 1, wherein the second communication mode comprises wired communication.

9. The computing device of claim 1, wherein the first communication mode comprises radio frequency communications within a first frequency range.

10. The computing device of claim 9, wherein the second communication mode comprises radio frequency communications within a second frequency range that is different from the first frequency range.

11. The computing device of claim 1, the operations comprising:

after communicating the data to the device at the property using the second communication mode, determining that the jamming event is no longer occurring for the first communication mode; and in response to determining that the jamming event is no longer occurring for the first communication mode, communicating additional data to the device at the property using the first communication mode.

12. The computing device of claim 1, comprising a radio frequency receiver, wherein the first communication mode comprises radio frequency communication, the operations comprising:

determining that the jamming event is occurring for the first communication mode by determining that a power level of radio frequency waves detected by the radio frequency receiver satisfies a predetermined threshold.

13. The computing device of claim 1, wherein determining that the jamming event is occurring for the first communication mode comprises:

determining that a radio frequency jamming event is occurring by determining that the one or more processors are not able to communicate with a radio frequency receiver of the device at the property using radio frequency communication.

14. The computing device of claim 1, wherein the first communication mode comprises radio frequency communication and the second communication mode comprises audio communication.

15. The computing device of claim 14, comprising:

a transmitter that is configured to output radio frequency waves in the first communication mode; and a speaker that is configured to output audio tones in the second communication mode.

16. The computing device of claim 1, the operations comprising:

in response to determining that the jamming event is occurring for the first communication mode, activating an alarm at the property.

17. The computing device of claim 1, wherein the data indicates at least one of (i) an indication that a door was opened, (ii) an indication that a window was opened, (iii) an indication that motion was detected, (iv) an indication that glass was broken, (v) an indication that smoke was detected, (vi) an indication that carbon monoxide was detected, or (vii) an indication that moisture was detected.

18. The computing device of claim 1, wherein the second communication mode comprises audible sound.

19. The computing device of claim 1, wherein the second communication mode comprises inaudible sound.

20. A computer-implemented method, comprising:

determining, by a computing device, to communicate data to a device at a property;

determining, by the computing device, that a jamming event is occurring at the property for a first communication mode; and in response to determining that the jamming event is occurring at the property for the first communication mode, using a second communication mode that is different from the first communication mode to communicate, from the computing device, the data to the device at the property.

* * * * *